United States Patent
Backhaus-Ricoult et al.

(10) Patent No.: US 8,119,234 B2
(45) Date of Patent: Feb. 21, 2012

(54) ANISOTROPIC POROUS CERAMIC ARTICLE AND MANUFACTURE THEREOF

(75) Inventors: Monika Backhaus-Ricoult, Horseheads, NY (US); Christopher Raymond Glose, Painted Post, NY (US); James William Zimmermann, Corning, NY (US)

(73) Assignee: Corning Incorporated, Corning, NY (US)

( * ) Notice: Subject to any disclaimer, the term of this patent is extended or adjusted under 35 U.S.C. 154(b) by 549 days.

(21) Appl. No.: 12/332,866

(22) Filed: Dec. 11, 2008

(65) Prior Publication Data

US 2009/0220734 A1 Sep. 3, 2009

Related U.S. Application Data

(60) Provisional application No. 61/067,615, filed on Feb. 29, 2008.

(51) Int. Cl.
*B32B 3/26* (2006.01)
(52) U.S. Cl. .............. 428/338; 428/312.2; 428/312.8; 428/316.6; 428/689; 428/698; 428/701; 428/702

(58) Field of Classification Search .................. None
See application file for complete search history.

(56) References Cited

U.S. PATENT DOCUMENTS

| 7,052,532 B1 | 5/2006 | Liu et al. |
| 7,364,689 B2 | 4/2008 | Noguchi et al. |
| 2007/0259769 A1 | 11/2007 | Ellison et al. .............. 35/478 |

FOREIGN PATENT DOCUMENTS

| EP | 1852406 | 8/2008 | |
| JP | 59 186623 | 10/1984 | |
| WO | 00/76939 | 12/2000 | .............. 35/195 |
| WO | 2008096413 | 8/2008 | |

OTHER PUBLICATIONS

Kaul et al.; "Precursor selection and its role in the mechanical properties of porous SiC derived from Wood"; Materials Science and Engineering A 428 (2006) 225-232.

*Primary Examiner* — Ling Xu
(74) *Attorney, Agent, or Firm* — Joseph M. Homa; Matthew J. Mason

(57) ABSTRACT

An aluminum titanate-based ceramic is provided having an anisotropic microstructure which includes the reaction products of a plurality of ceramic-forming precursors. The batch contains at least one precursor in fibrous form. The inorganic ceramic has low thermal expansion. Porous ceramic bodies and the method of manufacture are also provided.

16 Claims, 16 Drawing Sheets

ANISOTROPIC POROUS CERAMIC ARTICLE AND MANUFACTURE THEREOF

RELATED APPLICATIONS

This application claims the benefit of U.S. Provisional Application No. 61/067,615, filed Feb. 29, 2008, entitled "Acicular Porous Ceramic Article and Manufacture Thereof."

FIELD

This invention relates to ceramics and porous ceramic articles having anisotropic microstructure and methods of manufacture of the articles, and in particular low thermal expansion porous articles comprised of a polycrystalline ceramic comprising an anisotropic microstructure, such as can be used as a catalyst support or substrate or filter.

BACKGROUND

Aluminum titanate-based substrates, typically in the form of a honeycomb body, have been used for a variety of applications such as catalytic substrates and filters for diesel particulate emission.

SUMMARY

In one aspect, a porous ceramic body is disclosed herein comprised of a polycrystalline ceramic comprising an anisotropic microstructure, the anisotropic microstructure being comprised of aligned polycrystalline multiphase reticular formations, and the porous body comprises aluminum titanate. Advantageously, the reticular formations are comprised of microcrystals. The reticular formations may be comprised of a primary solid phase and one or more minor solid phases. The microstructure may further comprise portions that do not exhibit alignment along with the portions that exhibit the alignment. In some embodiments, an exterior region of the reticular formations being comprised of a primary solid phase and an interior region of the reticular formations being comprised of a minor solid phase. In some embodiments, the porous body has a porosity of greater than 40%; in other embodiments greater than 45%; in still other embodiments greater than 50%; in yet other embodiments greater than 55%; and in other embodiments, greater than 60%; and in other embodiments greater than 65%. In some embodiments, the porous body is shaped into a honeycomb structure.

In another aspect, a porous body is disclosed herein comprising a polycrystalline ceramic comprised of an anisotropic microstructure, the anisotropic microstructure being comprised of aligned polycrystalline reticular formations comprising a primary solid phase of aluminum titanate. In some embodiments, the polycrystalline reticular formations are multiphase polycrystalline reticular formations.

In yet another aspect, an inorganic composition is disclosed herein comprised of an anisotropic microstructure comprising the reaction product of a plurality of ceramic-forming precursors, wherein the reaction product is present as polycrystalline reticular formations. The inorganic polycrystalline composition can advantageously comprise a low thermal expansion ceramic. In some embodiments, the ceramic is microcracked.

In still another aspect, a method is disclosed herein for forming a porous body comprised of a first ceramic phase of aluminum titanate, the method comprising: forming a plasticized mixture comprising a plurality of inorganic ceramic-forming precursors including a first precursor, wherein at least part of the first precursor is present in the mixture in the form of fibers; shaping the plasticized mixture into a green body; and heating the green body sufficient to cause the precursors to react and produce the first ceramic phase, wherein at least part of the first ceramic phase is comprised of a partially anisotropic microstructure comprised of polycrystalline reticular formations, and wherein at least some of the precursor fibers serve as templates for the reticular formations. Thus, the overall morphology of the interlinked templates in the precursor material mixture is partially preserved during the high temperature reaction, in which the fibers provide precursor material that is converted into the first ceramic phase. In some embodiments, a portion of the precursor fibers reacts during the heating into the first ceramic phase, while an excess portion of the precursor fibers remains unreacted; in some of these embodiments, at least some of the excess portion is disposed in an interior region of at least some of the polycrystalline reticular formations.

In yet another aspect, the production of highly porous aluminum titanate-based ceramic articles for filter and substrate applications is disclosed herein, as well as batch compositions and processes for making ceramic articles employing at least one raw material that is fibrous, and which acts as a microstructural template during the reactive firing and produces an anisotropic microstructure in the final, fired ceramic article. Ceramic articles made in accordance herewith exhibit high strength, low coefficient of thermal expansion (CTE) and high porosity. In the alternative and more preferably in addition, the ceramic articles exhibit high thermal shock resistance through high fracture toughness, low thermal expansion, high strength, or low elastic modulus, or combinations thereof, and high filtration efficiency at low backpressure (due to high porosity, high pore interconnectivity, narrow pore size distribution, or small fraction of small pores, or combinations thereof).

In still another aspect, a process is disclosed herein for making highly porous low thermal expansion ceramic articles. The process comprises steps of preparing a low expansion material forming batch (e.g. for forming low expansion aluminum titanate-based ceramic) comprising sources of particulate raw materials and at least one source of a fibrous raw material. In some embodiments, inorganic fibrous raw materials can include oxides of aluminum, silicon, magnesium, titanium, zirconium, and iron, and combinations thereof. For example, for aluminum titanate-based composites, combinations for a feldspar-aluminum titanate composite can include sources of titania, alumina, silica, strontium oxide and optionally other additions or sinter additives. Such inorganics can be mixed with organic pore formers, binders, lubricants or plasticizers, or combinations thereof, to obtain a plasticized (or "plastic") ceramic-forming mixture that is formed into a shaped article by, but not limited to, extruding through a die, for example into a honeycomb structure. The method may further comprise drying and heating the shaped article at a temperature and for a time effective to convert the shaped article into the low thermal expansion ceramic article.

In still another aspect, batch compositions are disclosed herein comprising fibrous raw materials that produce an anisotropic ceramic microstructure and can provide high porosity, a narrow pore size distribution, desirable CTE, low elastic modulus, or high strength, or combinations thereof. Such properties can help to provide improved substrate or filter characteristics, such as low pressure drop, higher filtration efficiency and higher thermal shock resistance at high strength.

BRIEF DESCRIPTION OF THE DRAWINGS

FIG. 4a is an SEM photomicrograph of as fired pellet surface of ceramic A16 obtained from fibrous alumina raw batch material by compaction.

FIG. 4n is an SEM photomicrograph of a polished honeycomb wall longitudinal section of ceramic P2 obtained from coarse particulate alumina raw material by RAM extrusion.

DETAILED DESCRIPTION

The compositions disclosed herein are porous ceramics, advantageously having low thermal expansion, with an anisotropic microstructure. In various embodiments disclosed herein, a porous ceramic body can be comprised of a polycrystalline ceramic comprising an anisotropic microstructure, the anisotropic microstructure being comprised of aligned multiphase polycrystalline reticular formations. In some embodiments, the multiphase polycrystalline reticular formations comprise multiphase polycrystalline reticular formations that are aligned directionally, at least generally, for example in the direction of extrusion of a body formed by extrusion. In some embodiments, the majority of the multiphase polycrystalline reticular formations are aligned in a common direction. The grains in the multiphase polycrystalline reticular formations in the anisotropic microstructure of the porous ceramic bodies disclosed herein can exhibit a preferential alignment. The preferential alignment of the grains, or the preferential alignment of the reticular formations, or both, of the porous ceramic bodies disclosed herein can manifest in an anisotropy in porosity and/or matter distribution in the microstructure. As used herein, preferential alignment means that all, or fewer than all, of structures such as pores, grains or reticular formations are aligned in a particular direction; in some embodiments, the majority of such structures are aligned in a particular direction.

Figure 1A:
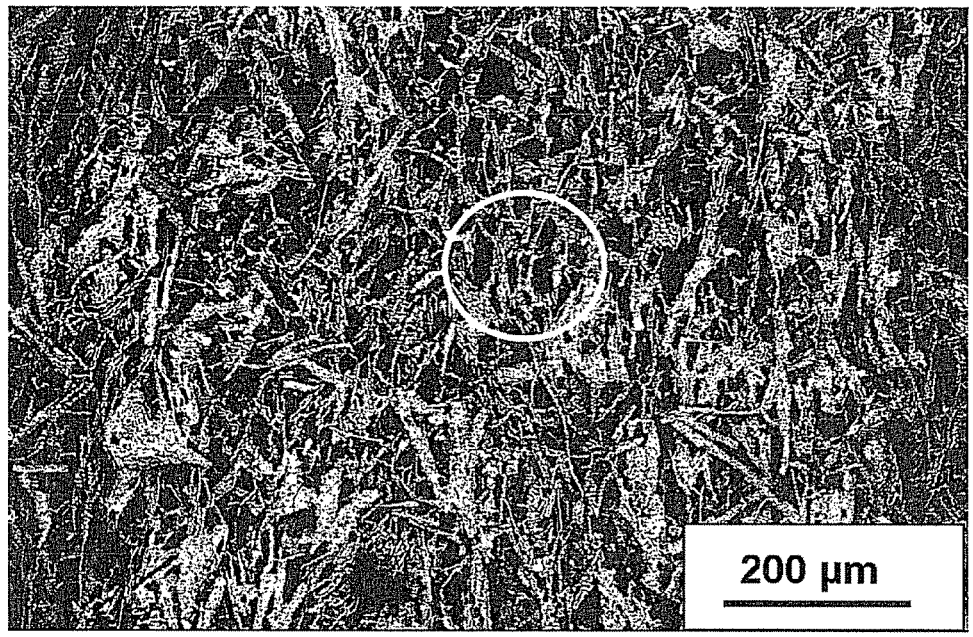
FIGS. 1a, 1b, 1c, 1d are SEM images of the anisotropic microstructure of a material disclosed herein obtained with fibrous alumina.
Figure 1B:
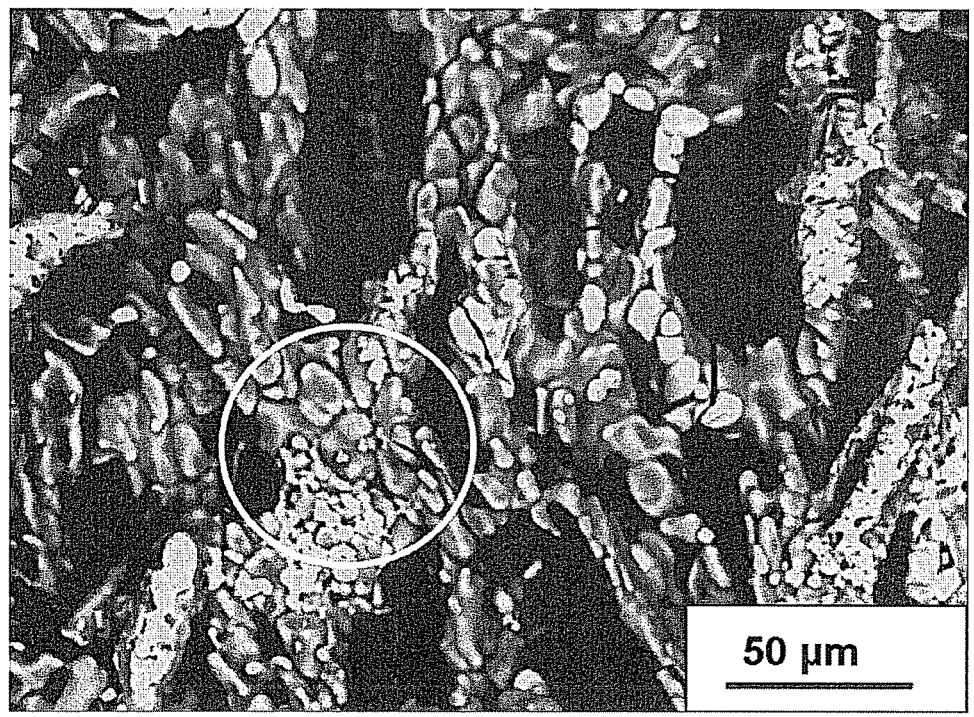
Figure 1C:
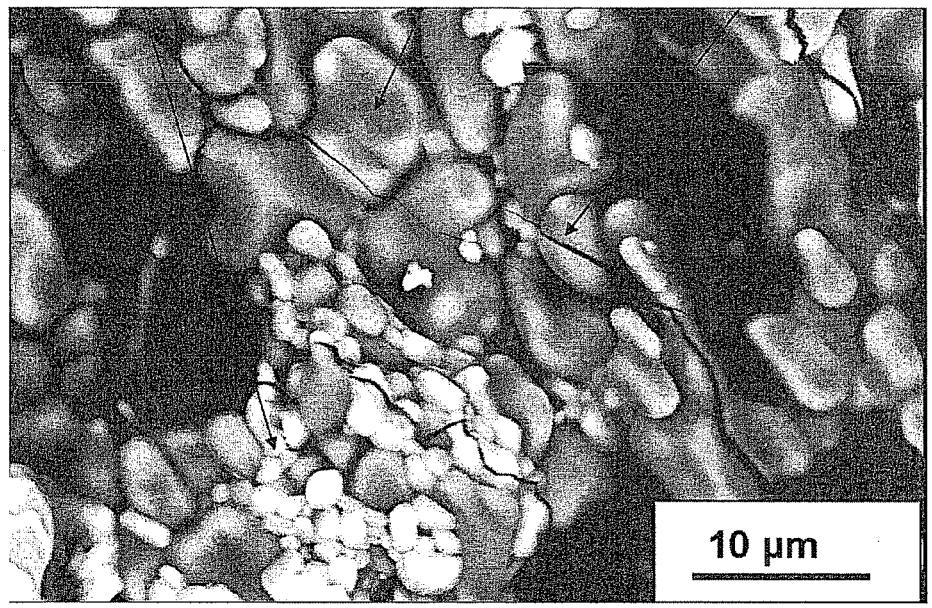
Figure 1D:
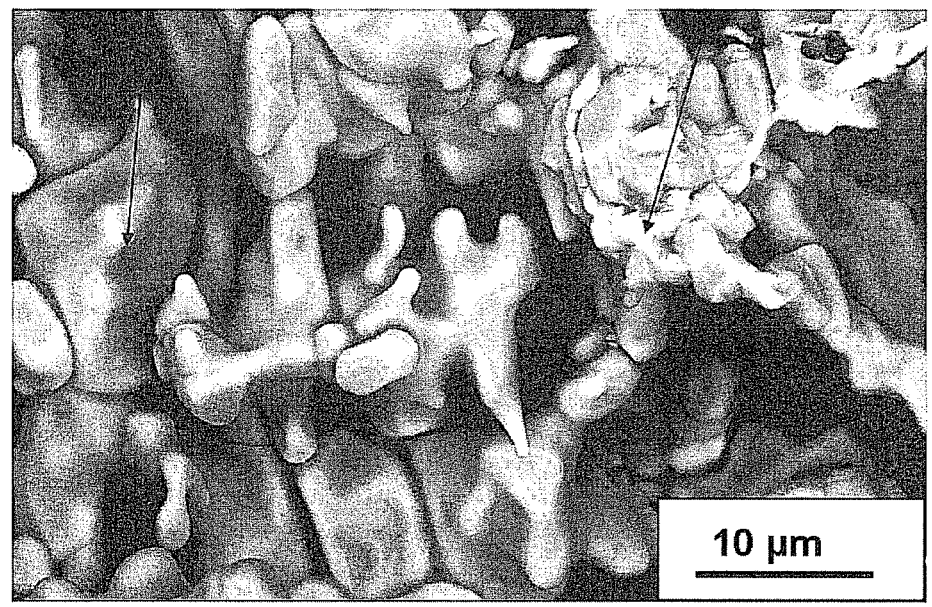

FIGS. 1a-1d show exemplary SEM images of the anisotropic microstructure of an exemplary aluminum titanate-feldspar composition obtained from fibrous alumina in the batch. The low magnification image of FIG. 1a illustrates the anisotropic microstructure of the high porosity ceramic; the successive enlargements of the encircled area in FIGS. 1b and 1c show the polycrystalline nature and multiphase character of the reticular formations formed by solid state reaction during firing of a body formed from a batch mixture containing precursor fibrous raw material. In FIGS. 1a-1c, the aluminum titanate (AT) phase appears in grey, the strontium feldspar phase in white. The chemical composition of the aluminum titanate phase in this example is 56 weight % alumina and 44 weight % titania, and the feldspar is a strontium feldspar with minor amounts of calcium and titanium. The aluminum titanate adopted the orthorhombic pseudo-brookite structure, the strontium feldspar was triclinic. Small amounts of glassy phase in the material were also observed by transmission electron microscopy studies, but are not all visible in the SEM images of FIGS. 1a-1c due to the small size of the glass pockets. In addition to silica, the glass also contained aluminum, titanium, strontium, calcium, and lanthanum. The SEM images further show that the ceramic is microcracked, wherein the thin black lines crossing aluminum titanate and feldspar grains in the figures are microcracks. The anisotropic AT-based materials can also exhibit a grain morphology of the AT-grains comprising an elongated dumbbell-type features, as shown in FIGS. 1c-1d that can yield and which can allow for interlocking of the grains.

In some embodiments, the compositions disclosed herein are produced by purposely including an excess amount of fibrous alumina precursor material in the batch. Such compositions with excess alumina fiber can result in a similar microstructure as materials without any significant excess, in that the microstructure is anisotropic, containing multiphase polycrystalline reticular formations. However, where excess exists, not all the fibrous alumina is reacted into the final reaction products (i.e. the excess alumina portion is not reacted), and a fraction of the alumina fibrous precursor from the batch remains unreacted in the final fired body. For example, for excess fibrous alumina in a batch composition, not all the fibrous alumina is reacted into the final reaction product, and a fraction can remain in the final material.

Figure 2:
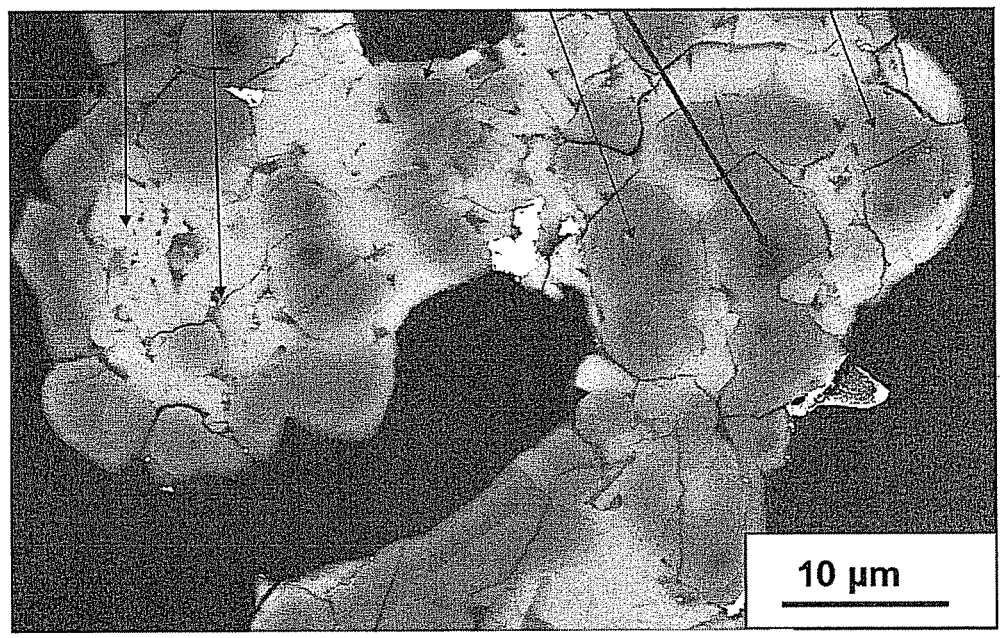
FIG. 2 is an SEM image of the anisotropic microstructure of a material obtained with fibrous alumina, including an excess of fibrous alumina, in the batch.

FIG. 2 is an SEM image of the anisotropic microstructure of a material obtained with fibrous alumina in the batch, wherein the batch included an excess of fibrous alumina. FIG. 2 shows a detail of a wall of a polished honeycomb cross section perpendicular to the channel direction and perpendicular to the extrusion direction. The image shows a composite microstructure having unreacted portions of the precursor alumina fibers, with an alumina phase (dark grey contrast), that are surrounded by aluminum titanate (medium grey contrast). Strontium feldspar appears in light grey contrast in the images. Some triangular, small glass pockets can be seen in the feldspar phase. Microcracks are also visible in FIG. 2 as thin black lines. Strength improvement of ceramics, such as AT-based compositions, can be optionally achieved in some embodiments using an excess of fibrous raw material, such as fibrous alumina, in the batch, wherein it is believed, without being bound by any theory, that the unreacted portions of fibers in the material may act as an optional reinforcement for the composite and offer toughening of the material Various examples of ceramics with anisotropic microstructure, such as aluminum titanate, are disclosed below and in the Figures, however, the present invention is not restricted to those exemplary materials, but can be applied to other monolithic or composite ceramics, particularly low expansion ceramics.

In one aspect, low expansion ceramics with anisotropic microstructure disclosed herein are obtained by using a fibrous raw material in the batch that acts during the reactive sintering of the green ware as a microstructure template for the formation of the primary reaction product, so that the imprint of the shape of the fibrous raw material precursor is generally preserved and the reaction product grains grow into polycrystalline reticular formations that are interlinked into an anisotropic porous microstructure.

For example, in embodiments which comprise a ceramic material comprising aluminum titanate, use of fibrous alumina precursor in the batch also imposes crystallographic texture of the aluminum titanate grains that form by solid reaction from the batch containing the fibrous alumina template. Thus a preferential crystallographic alignment has been observed of the crystallographic c-axis of aluminum titanate, which is herein defined as the negative expansion axis, while according to this definition a-axis and b-axis show positive expansion. In parts formed by compaction, the c-axis of aluminum titanate aligns preferentially in the plane perpendicular to the compaction axis. In parts formed by extrusion, the aluminum titanate shows preferential crystallographic alignment of its c-axis in the direction of the extrusion (channel of the honeycomb).

Additionally, the texture can be enhanced by a prealignment of the fibrous alumina raw material in the batch prior to the honeycomb extrusion, wherein very strong texture of c-direction of aluminum titanate in the direction of the honeycomb axis can be achieved. For example, batch material containing the fibrous alumina material can be extruded through a coarse die, for example resulting in a spaghetti-like extrudate, and that extrudate can then be further extruded in a similar extrusion direction, e.g. through a die imparting a honeycomb structure to the extrudate, wherein that extrudate is further formed into a green body that can be fired into a ceramic article. As illustrated in one embodiment and example, texture can also be enhanced by using long precursor fibers as compared to using short precursor fibers. Texture can also be enhanced during mixing of the batch materials, such as the precursors and other raw materials, prior to extrusion with procedures that reduce mechanical solicitation so as to reduce breakage of the precursor fibers; in some embodiments, the lowest possible mechanical solicitation can be advantageous. Texture can also be enhanced by utilizing one or more apparatus that allows the precursor fibers to align before going through a forming die such as an extrusion die; for example, a twin screw extruder can help align the fiber before going through an extrusion die. MOR can be significantly improved in the alignment direction without major compromise of the MOR in directions perpendicular to the alignment direction as compared to particulate derived material. Due to the preferential crystallographic alignment of the c-axis of aluminum titanate in the extrusion direction, the CTE of the material in this direction is very close to zero or negative, while in the direction perpendicular to the alignment the CTE is positive, and compared to particulate derived materials without any preferential alignment, more positive.

Figure 2A:
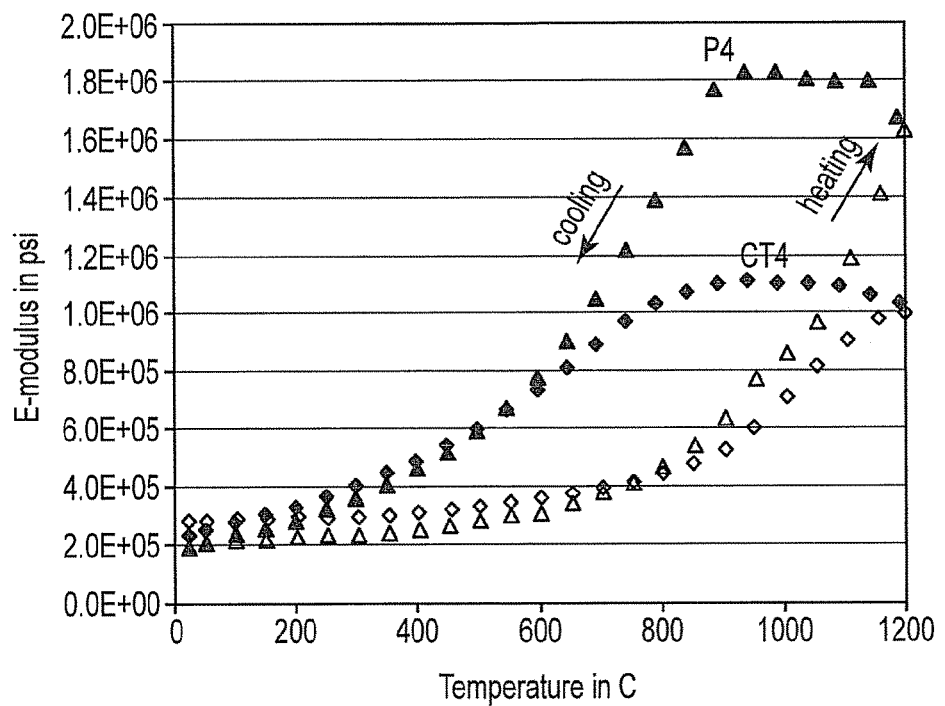
FIG. 2A is a plot of the axial elastic modulus as function of temperature during heating and cooling for various honeycomb bodies extruded with 300 cells per square inch and 14 mil wall thickness.

As seen in FIG. 2A, the elastic modulus of aluminum titanate-feldspar composites increases with increasing temperature and shows a significant hysteresis between heating and cooling cycles. Compared to a material that was obtained with particulate alumina (e.g. P4 in FIG. 2A, filled triangles—heating, hollow triangles—cooling), the material made with fibrous alumina (e.g. CT4 in FIG. 2A, filled diamonds—heating, hollow diamonds—cooling) shows no significant change in its room temperature elastic modulus, but a much lower elastic modulus at 1200° C., and also a much lower elastic modulus during cooling from 1200° C. within an extended temperature range, resulting in much lesser hysteresis. It is believed, without being bound by any theory that due to the reticular formations in the microstructure and the preferential crystallographic alignment in the material obtained from using the fibrous alumina in the batch, the quantity or length of the microcracks are reduced or are associated with different levels of microcrack energy than in corresponding materials obtained from particulate alumina.

Batch Compositions and Raw Materials

Some examples of aluminum containing fibrous materials that can be used in the ceramic-forming batch mixture include alumina, alumino-silicates, aluminum titanate, and magnesio-alumino-silicates. In the examples below, fibers having a composition of 96-97% $Al_2O_3$ and 3-4% $SiO_2$ with median fiber length 3 mm and diameter 3-25 micrometers were used as fibrous raw material. These compositions and dimensions of the fibers are only exemplary, not limiting. Other fiber dimensions or compositions can be used.

For the preparation of exemplary aluminum titanate-feldspar ceramic composites, the following batch materials were used in different combinations as source for alumina: coarse particulate alumina with average particle size of about 10 μm and broad particle size distribution, fine particulate alumina with average size of 1 μm or less and broad particle size distribution, hydrated alumina and alumina fiber. The batch ingredients further included fine titania with submicrometer particle size, coarse or fine silica and coarse strontium carbonate. The batch also included pore formers, namely coarse starch such as potato starch, or fine starch such as corn starch, and/or graphite, which yield different pore sizes, coarse starch leading to larger pores than fine starch. Exemplary raw material characteristics for aluminum titanate-feldspar batches are listed in Table 1.

TABLE 1

Specifications of raw material used in exemplary AT-based batches

| | Abbreviation | Median Particle Diameter (μm) |
|---|---|---|
| Raw Material | | |
| Coarse Silica | S1 | 10 |
| Fine Silica | S2 | 4-6 |
| Coarse Alumina | A | 10-25 |
| Fine Alumina | B | 0.1-3 |
| Rutile | | 0.1-5 |
| Lanthanum Oxide | | 0.1-10 |
| Alumina, hydrate | | 1-10 |
| Strontium Carbonate | | 5-20 |
| Calcium Carbonate | | 5-20 |
| Alumina fiber | F1 | 2-30 diameter, 50-3000 length |
| Alumina fiber | F2 | 5-10 diameter, 200-1000 length |
| Alumina fiber | F3 | 3-20 diameter, 50-1000 length |
| Pore Former | | |
| Fine starch (e.g. corn starch) | CS | 10-20 |
| Large starch (e.g. potato starch) | PS | 25-50 |
| Graphite | | 30-50 |

Exemplary batch compositions are listed in TABLE 2 for forming the aluminum titanate-feldspar composites. Batch compositions were chosen that yielded a mixture of aluminum titanate and feldspar in the approximate range of 3.5:1.

TABLE 2

Batch compositions for AT-based materials

| Code | % fiber | alumina type | % alumina particulate | % hydrated alumina | particulate % SiO2 | % SrCO3 | % CaCO3 | % TiO2 | % La2O3 | % Pore former as superaddition | Pore former |
|---|---|---|---|---|---|---|---|---|---|---|---|
| A16 | 48.01 | na | 0.00 | 3.71 | 8.75 | 8.00 | 1.38 | 29.95 | 0.20 | 0.00 | CS |
| B1 | 15.00 | A | 36.87 | 3.71 | 9.89 | 8.00 | 1.38 | 29.95 | 0.20 | 15.00 | CS |
| B2 | 20.00 | A | 27.17 | 3.71 | 9.59 | 8.00 | 1.38 | 29.95 | 0.20 | 15.00 | PS |
| B3 | 10.00 | A | 37.17 | 3.71 | 9.89 | 8.00 | 1.38 | 29.95 | 0.20 | 15.00 | PS |
| B4 | 10.00 | A | 37.17 | 3.71 | 9.89 | 8.00 | 1.38 | 29.95 | 0.20 | 15.00 | CS |
| B5 | 20.00 | A | 27.17 | 3.71 | 9.59 | 8.00 | 1.38 | 29.95 | 0.20 | 15.00 | CS |
| B6 | 10.00 | B | 36.87 | 3.71 | 9.89 | 8.00 | 1.38 | 29.95 | 0.20 | 15.00 | CS |
| B7 | 15.00 | B | 36.87 | 3.71 | 9.89 | 8.00 | 1.38 | 29.95 | 0.20 | 15.00 | PS |
| B8 | 15.00 | B | 36.87 | 3.71 | 9.89 | 8.00 | 1.38 | 29.95 | 0.20 | 15.00 | CS |
| B9 | 20.00 | B | 36.87 | 3.71 | 9.89 | 8.00 | 1.38 | 29.95 | 0.20 | 15.00 | CS |
| C1 | 46.57 | na | 0.00 | 3.71 | 10.19 | 8.00 | 1.38 | 29.95 | 0.20 | 0.00 | |
| C2 | 46.57 | na | 0.00 | 3.71 | 10.19 | 9.00 | 1.38 | 29.95 | 0.20 | 15.00 | CS |
| C3 | 48.01 | na | 0.00 | 3.71 | 8.75 | 8.00 | 1.38 | 29.95 | 0.20 | 15.00 | CS |
| C4 | 51.57 | na | 0.00 | 3.71 | 10.19 | 9.00 | 1.38 | 29.95 | 0.20 | 15.00 | CS |
| C5 | 51.57 | na | 0.00 | 3.71 | 10.19 | 9.00 | 1.38 | 29.95 | 0.20 | 15.00 | CS |
| C6 | 66.57 | na | 0.00 | 3.71 | 10.19 | 8.00 | 1.38 | 29.95 | 0.20 | 15.00 | CS |
| C7 | 51.57 | na | 0.00 | 3.71 | 10.19 | 8.00 | 1.38 | 29.95 | 0.20 | 15.00 | CS |
| C8 | 48.01 | na | 0.00 | 3.71 | 8.75 | 8.00 | 1.38 | 29.95 | 0.20 | 15.00 | CS |
| C9 | 48.01 | na | 0.00 | 3.71 | 8.75 | 8.00 | 1.38 | 29.95 | 0.20 | 25.00 | CS |
| C10 | 48.01 | na | 0.00 | 3.71 | 8.75 | 8.00 | 1.38 | 29.95 | 0.20 | 50.00 | CS |
| C11 | 48.01 | na | 0.00 | 3.71 | 8.75 | 8.00 | 1.38 | 29.95 | 0.20 | 7.00 | PS |
| C12 | 48.01 | na | 0.00 | 3.71 | 8.75 | 8.00 | 1.38 | 29.95 | 0.20 | 15.00 | PS |
| C13 | 48.01 | na | 0.00 | 3.71 | 8.75 | 8.00 | 1.38 | 29.95 | 0.20 | 25.00 | PS |
| C14 | 48.01 | na | 0.00 | 3.71 | 8.75 | 8.00 | 1.38 | 29.95 | 0.20 | 35.00 | PS |
| C15 | 48.01 | na | 0.00 | 3.71 | 8.75 | 8.00 | 1.38 | 29.95 | 0.20 | 50.00 | PS |
| C16 | 48.01 | na | 0.00 | 3.71 | 8.75 | 8.00 | 1.38 | 29.95 | 0.20 | 15.00 | PS |
| C17 | 68.01 | na | 0.00 | 3.71 | 8.15 | 8.00 | 1.38 | 29.95 | 0.20 | 15.00 | PS |
| C18 | 48.01 | na | 0.00 | 3.71 | 8.75 | 8.00 | 1.38 | 29.95 | 0.20 | 15.00 | PS |
| C19 | 48.01 | na | 0.00 | 3.71 | 8.72 | 8.00 | 1.38 | 29.95 | 0.20 | 15.00 | PS |
| C20 | 49.05 | na | 0.00 | 0.00 | 8.72 | 8.00 | 1.38 | 29.95 | 0.20 | 15.00 | PS |
| C21 | 48.00 | na | 0.00 | 1.05 | 0.00 | 1.13 | 0.19 | 29.95 | 0.20 | 15.00 | PS |
| C22 | 48.01 | na | 0.00 | 3.71 | 8.75 | 8.00 | 1.38 | 29.95 | 0.20 | 15.00 | PS |
| C23 | 48.01 | na | 0.00 | 3.71 | 8.75 | 8.00 | 1.38 | 29.95 | 0.20 | 15.00 | PS |
| C24 | 48.01 | na | 0.00 | 3.71 | 8.75 | 8.00 | 1.38 | 29.95 | 0.20 | 15.00 | PS |
| CT1 | 51.57 | na | 0.00 | 3.71 | 10.19 | 9.00 | 1.38 | 29.95 | 0.20 | 15.00 | CS |
| CT2 | 48.01 | na | 0.00 | 3.71 | 8.75 | 8.00 | 1.38 | 29.95 | 0.20 | 15.00 | PS |

TABLE 2-continued

Batch compositions for AT-based materials

| Code | % fiber | alumina type | % alumina particulate | % hydrated alumina | particulate % SiO2 | % SrCO3 | % CaCO3 | % TiO2 | % La2O3 | % Pore former as superaddition | Pore former |
|---|---|---|---|---|---|---|---|---|---|---|---|
| CT3 | 48.01 | na | 0.00 | 3.71 | 8.75 | 8.00 | 1.38 | 29.95 | 0.20 | 15.00 | CS |
| CT4 | 48.01 | na | 0.00 | 3.71 | 8.75 | 8.00 | 1.38 | 29.95 | 0.20 | 15.00 | PS |
| CT6 | 48.51 | na | 0.00 | 3.71 | 8.25 | 8.00 | 1.38 | 29.95 | 0.20 | 15.00 | PS |
| D1 | 48.51 | na | 0.00 | 3.71 | 8.25 | 8.00 | 1.38 | 29.95 | 0.20 | 15.00 | PS |
| E1 | 20.38 | A | 36.38 | 3.71 | 0.00 | 8.00 | 1.38 | 29.95 | 0.20 | 15.00 | PS |
| F1 | 40.76 | A | 16.00 | 3.71 | 0.00 | 8.00 | 1.38 | 29.95 | 0.20 | 15.00 | PS |
| P1 | 0.00 | A + B | 46.57 | 3.71 | 10.80 | 8.00 | 1.38 | 29.95 | 0.20 | 0.00 | CS |
| P2 | 0.00 | A | 46.57 | 3.71 | 10.19 | 8.00 | 1.38 | 29.95 | 0.20 | 15.00 | CS |
| P3 | 0.00 | A | 46.57 | 3.71 | 10.19 | 8.00 | 1.38 | 29.95 | 0.20 | 15.00 | PS |
| P4 | 0.00 | A | 46.57 | 3.71 | 10.19 | 8.00 | 1.38 | 29.95 | 0.20 | 25.00 | PS/Gr |
| PT1 | 0.00 | A | 46.57 | 3.71 | 10.19 | 8.00 | 1.38 | 29.95 | 0.20 | 15.00 | CS |

In Table 2, CS=corn starch, PS=potato starch, g=graphite, A is coarse alumina powder with median particle size between 10 and 15 micrometer, B is a fine alumina with submicrometer median grain size, and % are given in % of inorganics with pore formers (potato starch, cornstarch and graphite) being reported as superaddition to the inorganics. Extrusion batches typically contained a water level of about 30%. Some batches contained additional lubricants.

Low expansion ceramics with anisotropic microstructure as disclosed herein were obtained by different forming processes. In some embodiments, a slurry of the raw materials can be pressed into a form. In other embodiments, a paste of the raw materials (including binder and water) can be extruded into a honeycomb shape e.g. by using a ram extruder or a twin screw extruder or a combination of both. In some embodiments, one or more apparatus may be used to align precursor fibers prior to extrusion through an extrusion die, such as a ram extruder with a coarse die that yields spaghetti-like extrudate that can be subsequently input into an extruder with a finer die. The resulting shaped body, i.e. green ware, can be dried and then fired. During firing, the inorganic raw materials, including fibrous precursor, are reacted, or converted, into the final ceramic product.

FORMING EXAMPLE 1

Compacted Slurry to Form Anisotropic AT-Feldspar Composite

The batch composition A16 as indicated in TABLE 2 used fibrous raw material of composition 97% $Al_2O_3$ and 3% $SiO_2$ with fiber average length 3.2 mm and average diameter 3 micrometer. The fibers were incorporated into the batch by three-axis rotational dry mixing for 30 minutes. An addition of 14 weight percent water and 1% surfactant (Pluronic F127, BASF) was mixed into the batch using ball milling for two hours with alumina milling media. Excess liquids were decanted and pellets (wet) were punch pressed using a pressure of 5 MPa. The pellets were microwave dried and re-pressed with a pressure of 15 MPa. Pellets were reaction sintered with final temperatures between 1390° and 1440° C. According to the X-ray diffraction pattern, the final composition contained alumina titanate, feldspar and residual amounts of alumina and titania. Peak intensity ratios in the X-ray diffraction pattern showed in the pressed pellet a preferential alignment of the aluminum titanate crystallographic c-axis in the plane perpendicular to the pressing direction. The SEM image shows that the reaction products aluminum titanate and feldspar align perpendicular to the pressing direction into polycrystalline reticular formations forming an anisotropic microstructure with incorporated directional porosity, as seen, for example, in FIGS. 4a & 4b. The anisotropic microstructure was composed of polycrystalline reticular formations comprised of both aluminum titanate and feldspar small grains. The crystallographic c-axis of the aluminum titanate grains that is associated with the negative thermal expansion coefficient was preferentially aligned in the pressing plane.

FORMING EXAMPLE 2

Extruded Honeycomb Comprised of Anisotropic AT-Feldspar Composite (RAM, Twin Screw)

Honeycomb Porous Ceramics with Anisotropic Microstructure were Made by Ram and twin screw extrusion. The powderous batch ingredients, pore former and binder were pre-mixed. Dry ingredients were combined in a mulling pan and mulled, while fibrous alumina and batch water were either slowly added to the muller mixture, and mixed, or pre-mulled to break the fiber interlinked network up into a powder-like mix of short fibers, that was then added with the other raw materials into the muller. Distilled water was added during mulling until a suitable paste texture was reached.

In some cases, a RAM extruder was used for pre-extruding the paste into rods of 9 mm diameter or spaghetti of 1 mm diameter in a first and second run in order to improve the uniformity and plasticity of the batch material. The paste was then extruded on a RAM extruder into a honeycomb shape with a honeycomb die and shim of appropriate size. Unless otherwise noted herein, for 1" parts, RAM extrusions were performed with a die geometry (200/16) with 200 cells per square inch and a wall thickness 16 mil to provide 1" diameter extruded parts.

Green ware with different ratios of fibrous to particulate raw batch materials were extruded. In all cases, excellent green ware was obtained.

Unless otherwise noted herein, continuous feed twin screw extrusions were performed with a die geometry (300/14) with 300 cells per square inch and an extruded wall thickness 14 mil to provide 2" diameter honeycomb diameter extruded parts.

Unless otherwise noted herein, extruded green honeycomb parts were dried in a microwave oven at medium power for 5 minutes and then further dried in a drying oven for 24 hours at 85° C.

Figure 3A:
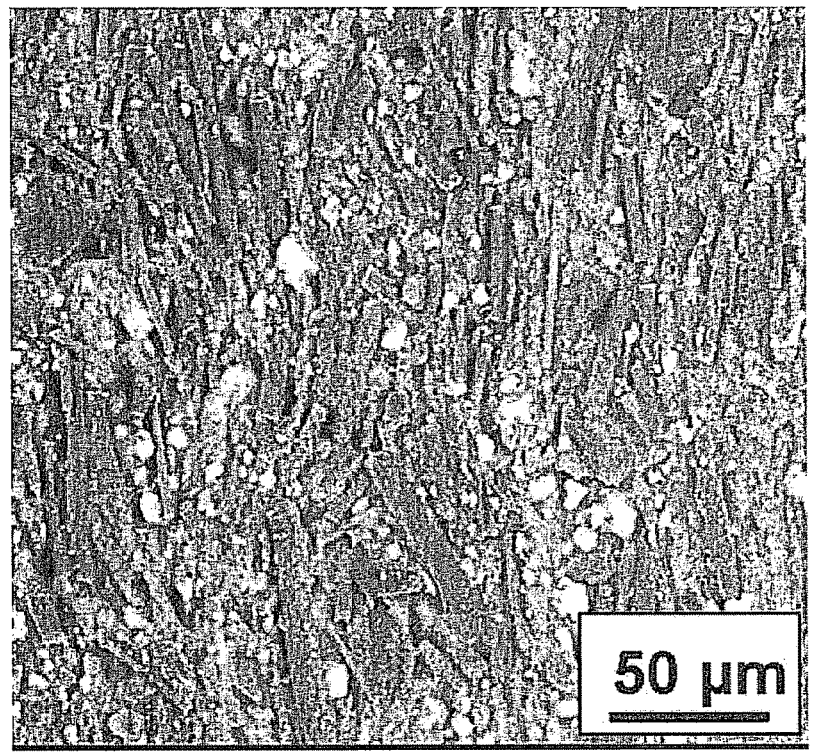
FIGS. 3a-3b are SEM micrographs of polished longitudinal section and cross-section, respectively, of a honeycomb wall of an as-extruded, dried and unreacted (green) ware obtained from fibrous alumina raw material in the batch.
Figure 3B:
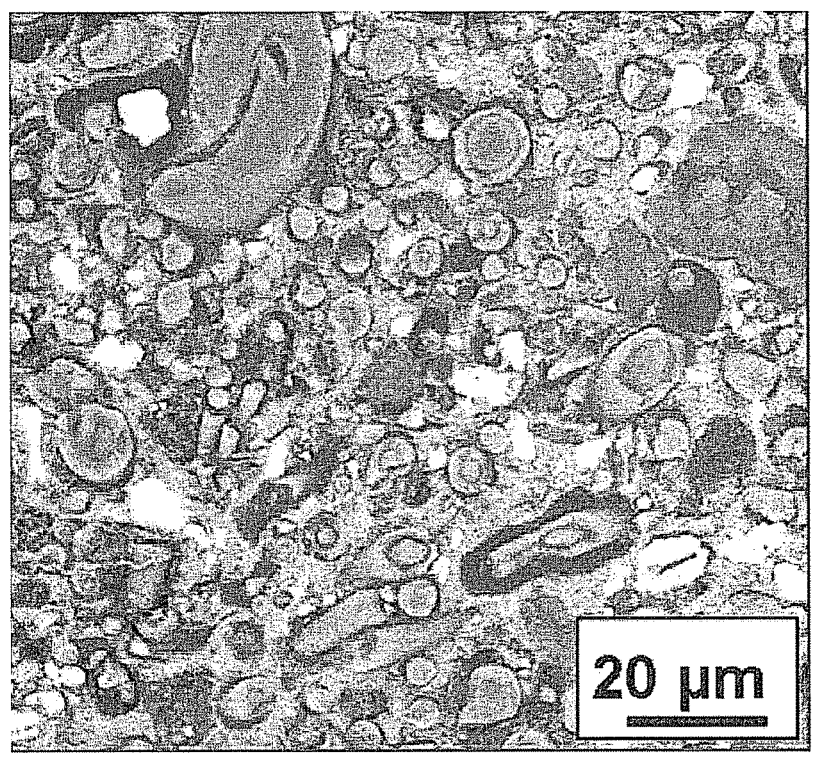

In some embodiments, a solid rod pre-extrusion with rod diameter 1-2 mm or 6-8 mm was used into a honeycomb extruder and the rod-alignment in the feed of the honeycomb extrusion was preserved, and in these cases the alumina raw material fibers showed more preferential alignment in the extrusion direction of the extruded green honeycomb. FIGS. 3a-3b show SEM micrographs of polished longitudinal section and cross-section, respectively, of a honeycomb wall of an as-extruded, dried and unreacted (green) ware formed from Batch 10 obtained with fibrous alumina raw material in the batch, illustrating a preferential alignment of the alumina fibers in the direction of the extrusion in the greenware.

Extruded parts of 4 to 10" lengths were fired after drying in a furnace in air using a heating rate of 120° C./h to the maximum firing temperature indicated in TABLE 5, which ranged from 1390° C. to 1440° C., a hold for 15 hours and cool down rate of about 60° C./hour.

Strength of partially fired parts was significantly improved where the fibrous alumina raw material was included in the batch. In the temperature range from 400° C.-800° C., the firing strength was improved by a factor of at least 10 when substituting particulate alumina in the batch with alumina fibers.

According to X-ray diffraction, the fully fired materials from AT batches contained aluminum titanate, feldspar and residual amounts of alumina, mullite and titania. The primary product phase was in all cases aluminum titanate. The phase contents of various compositions can be found in TABLE 5.

The microstructure of the materials obtained from fibrous alumina raw material in the batch was for all forming conditions anisotropic, and the degree of anisotropy depended upon the ratio of particulate to fibrous alumina raw material, wherein the more fibrous material present in the batch, the more anisotropic the resulting microstructure. We have found that at least in some embodiments the longer (length) the precursor alumina fiber in the batch, the greater the degree or amount of microstructural anisotropy in the fired ceramic part, provided that the longer fiber does not impede extrusion such as by blockage at screens.

Figure 4A:
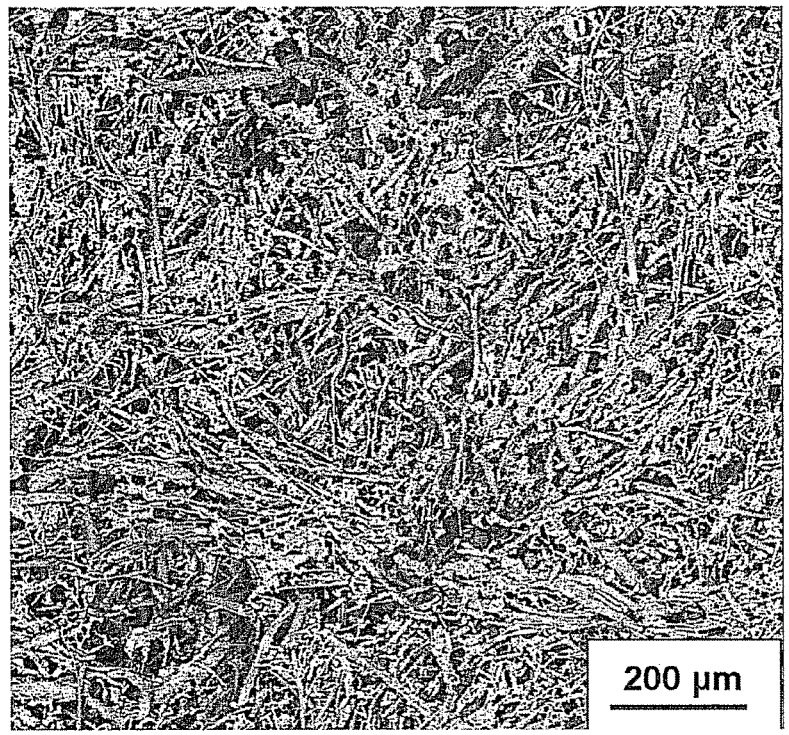
FIGS. 4a-4n are SEM views of various honeycomb wall microstructures for materials obtained with different ratios of particulate to fibrous alumina raw material in the batch and by different forming processes.
Figure 4B:
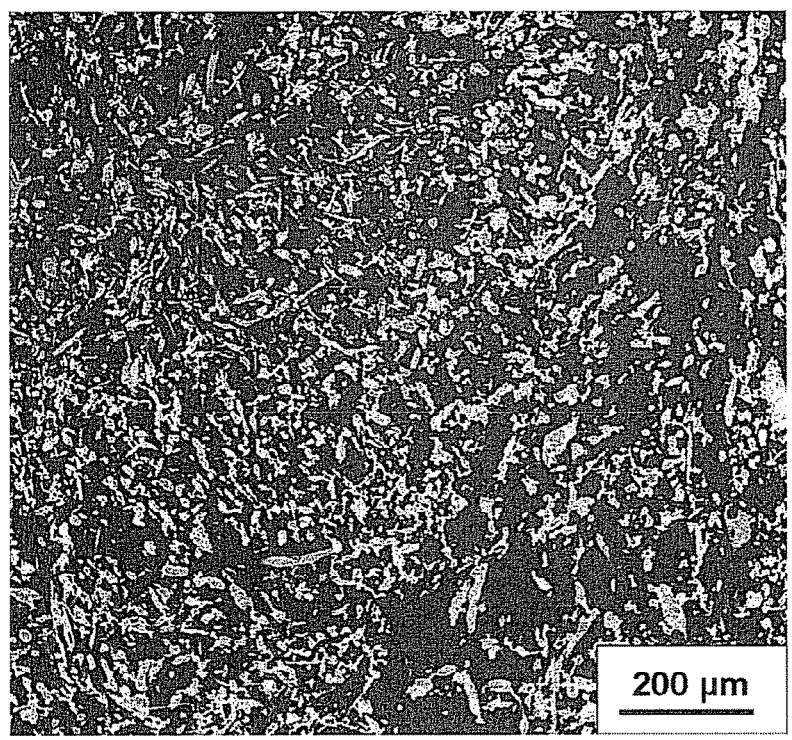
FIG. 4b is an SEM photomicrograph of a polished wall longitudinal section parallel to the direction of compaction force of ceramic A16 obtained using fibrous alumina raw material in the batch by compaction.
Figure 4C:
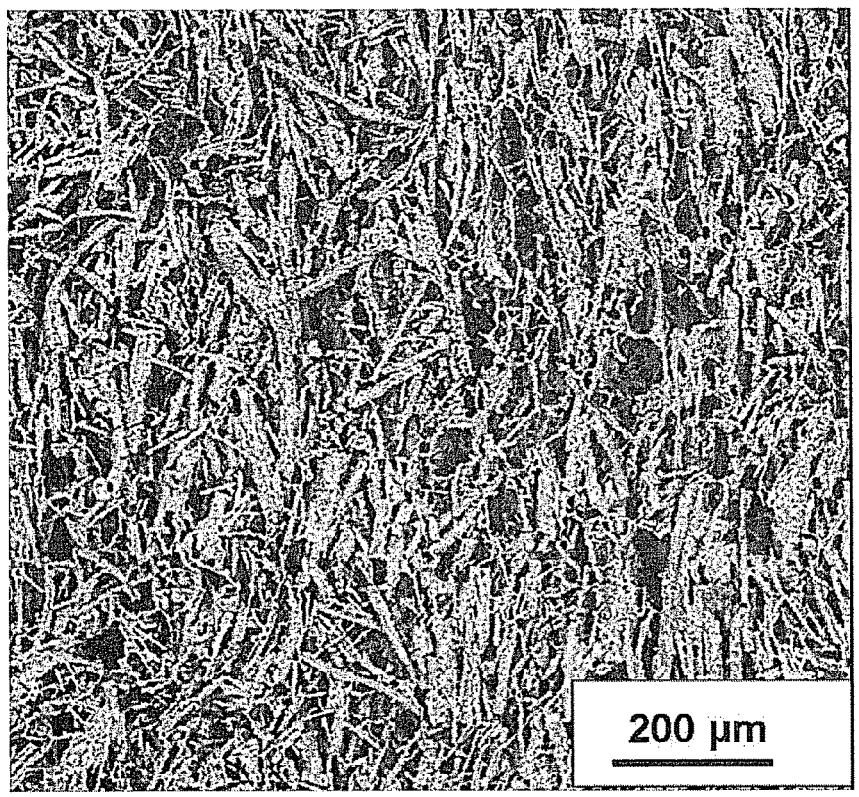
FIG. 4c is an SEM photomicrograph of an as fired honeycomb wall surface of ceramic C4 obtained from fibrous alumina raw material by RAM extrusion.
Figure 4D:
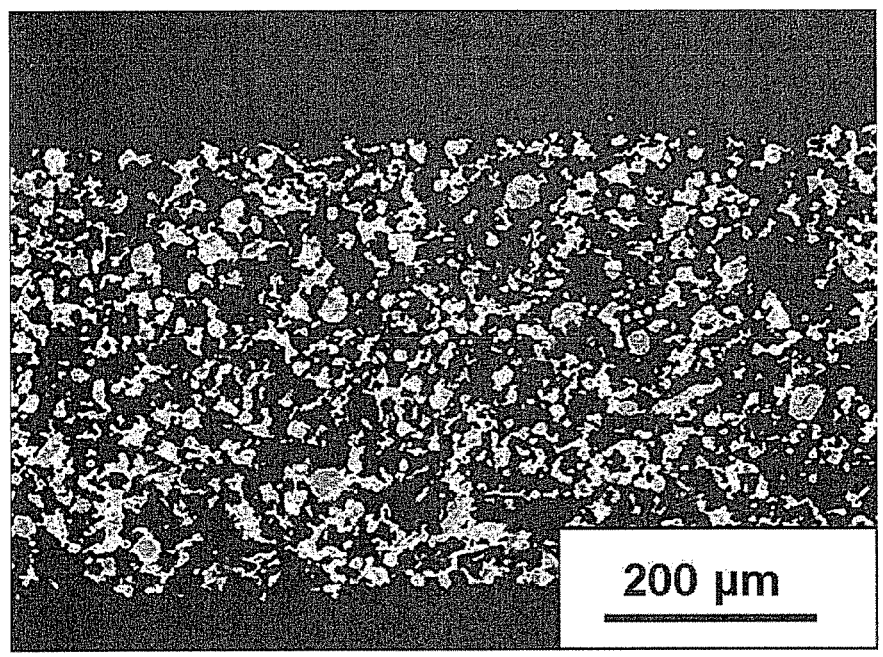
FIG. 4d is an SEM photomicrograph of a polished honeycomb wall cross section of ceramic C4 obtained from fibrous alumina raw material by RAM extrusion.
Figure 4E:
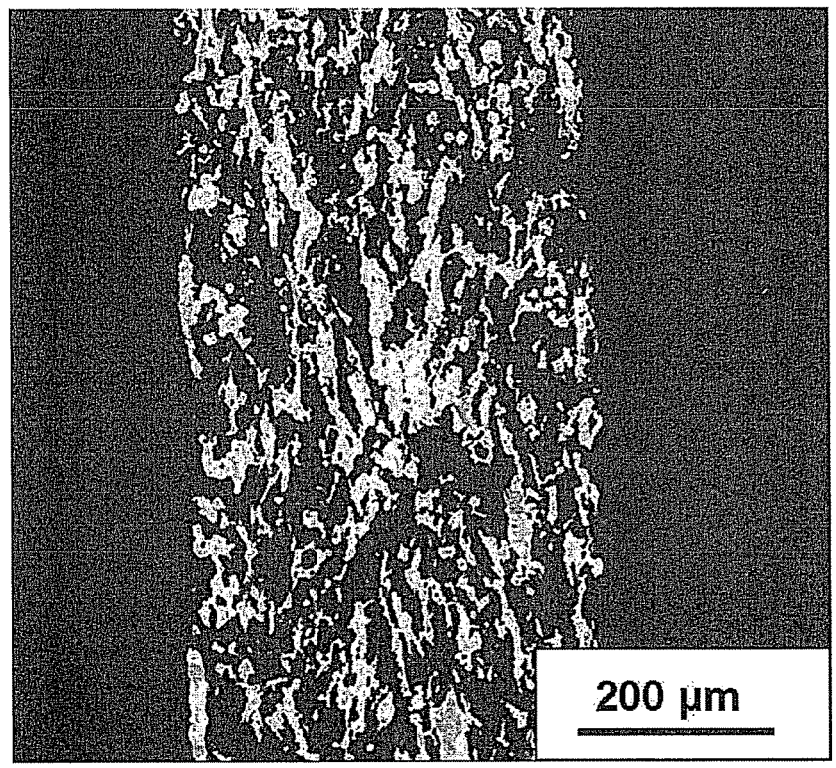
FIG. 4e is an SEM photomicrograph of a polished honeycomb wall longitudinal section of ceramic C4 obtained from fibrous alumina raw material by RAM extrusion.
Figure 4F:
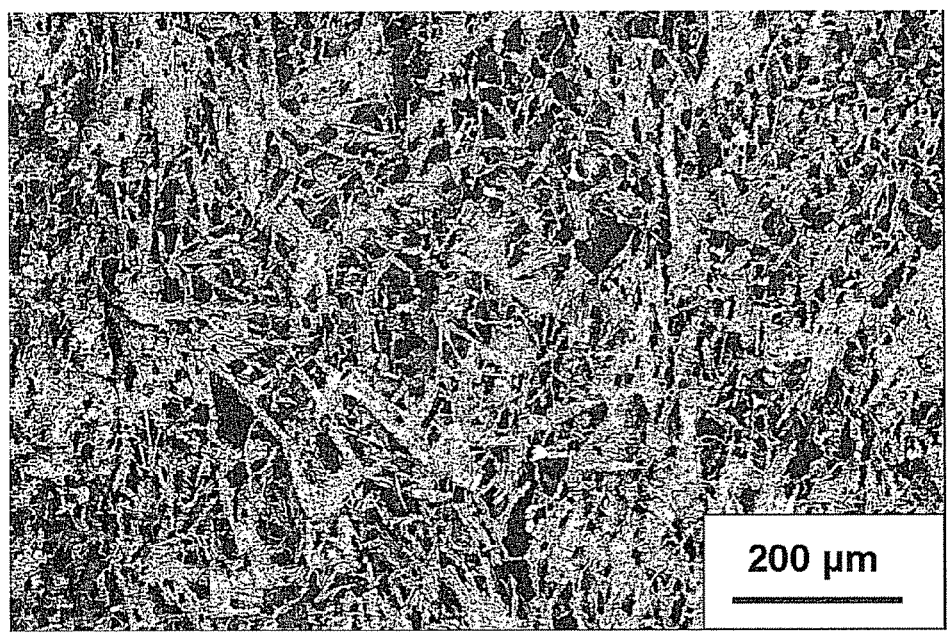
FIG. 4f is an SEM photomicrograph of an as fired honeycomb wall surface of ceramic CT1 obtained from fibrous alumina raw material by twin screw extrusion.
Figure 4G:
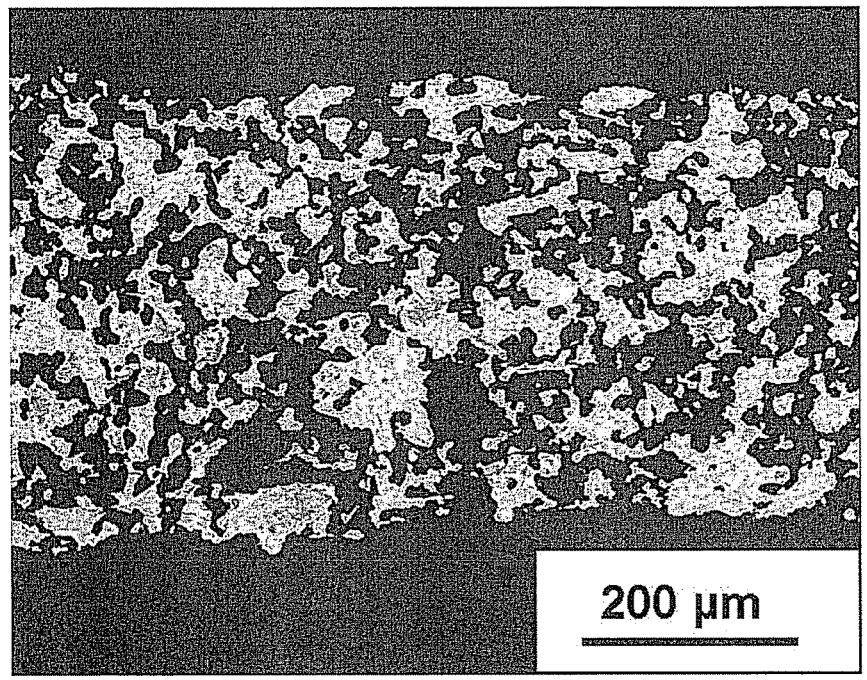
FIG. 4g is an SEM photomicrograph of a polished honeycomb wall cross section of ceramic CT1 obtained from fibrous alumina raw material by twin screw extrusion.
Figure 4H:
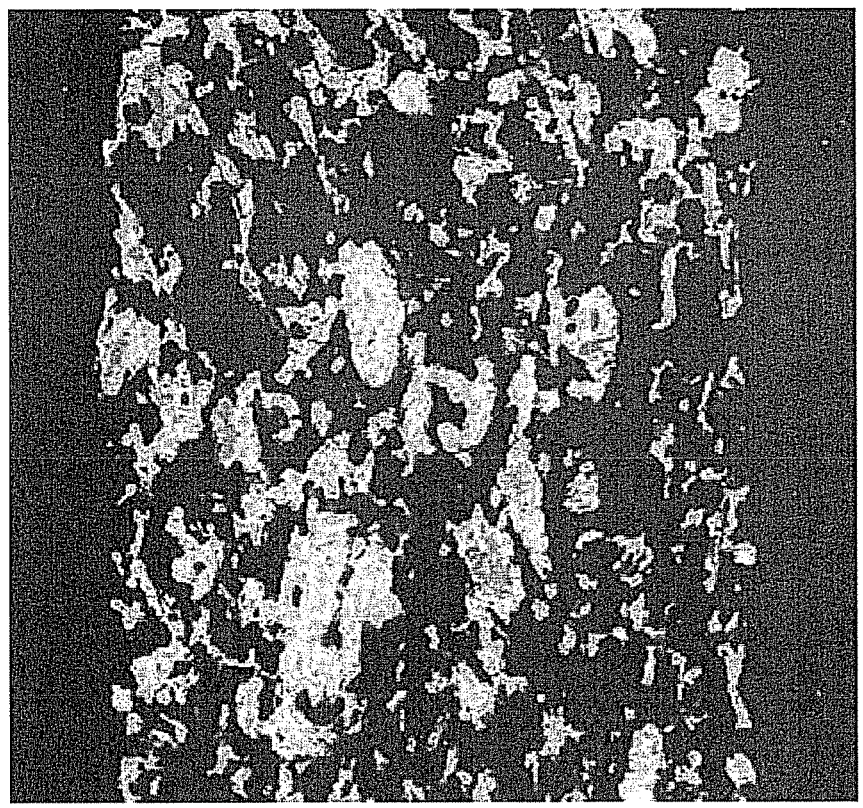
FIG. 4h is an SEM photomicrograph of a polished honeycomb wall longitudinal section of ceramic CT1 obtained from fibrous alumina raw material by twin extrusion.
Figure 4I:
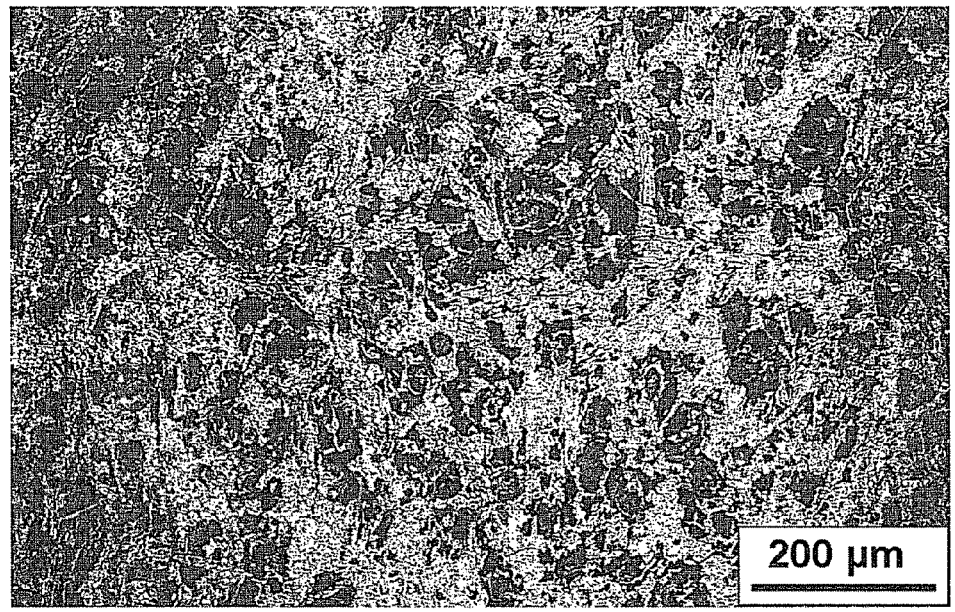
FIG. 4i is an SEM photomicrograph of an as fired honeycomb wall surface of ceramic B1 obtained from fibrous and particulate alumina raw material and with alumina excess by RAM extrusion.
Figure 4J:
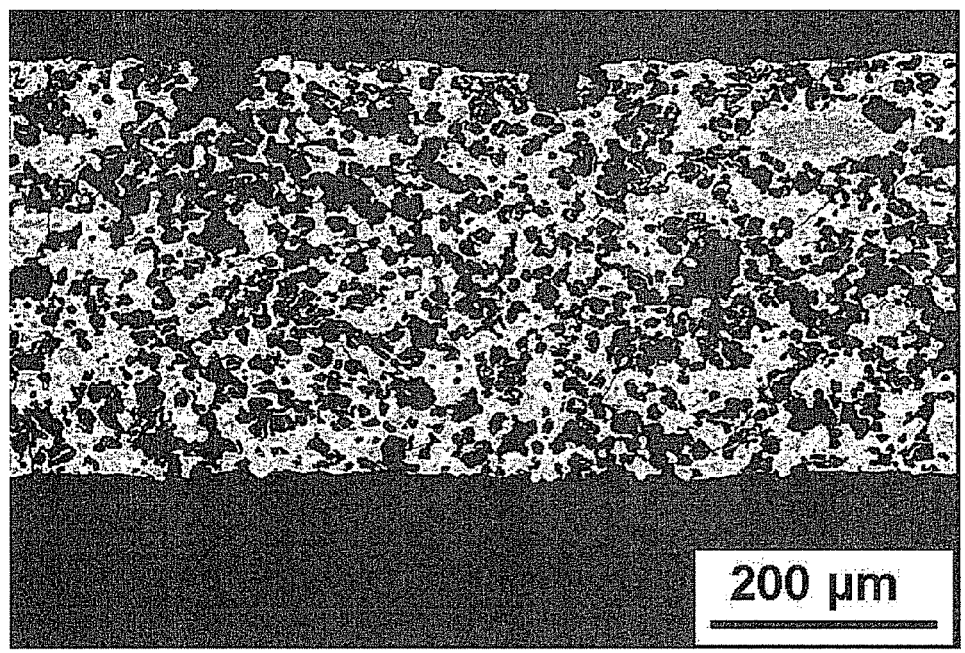
FIG. 4j is an SEM photomicrograph of a polished honeycomb wall cross section of ceramic B1 obtained from fibrous and particulate alumina raw material in ratio 1:2 and with alumina excess by RAM extrusion.
Figure 4K:
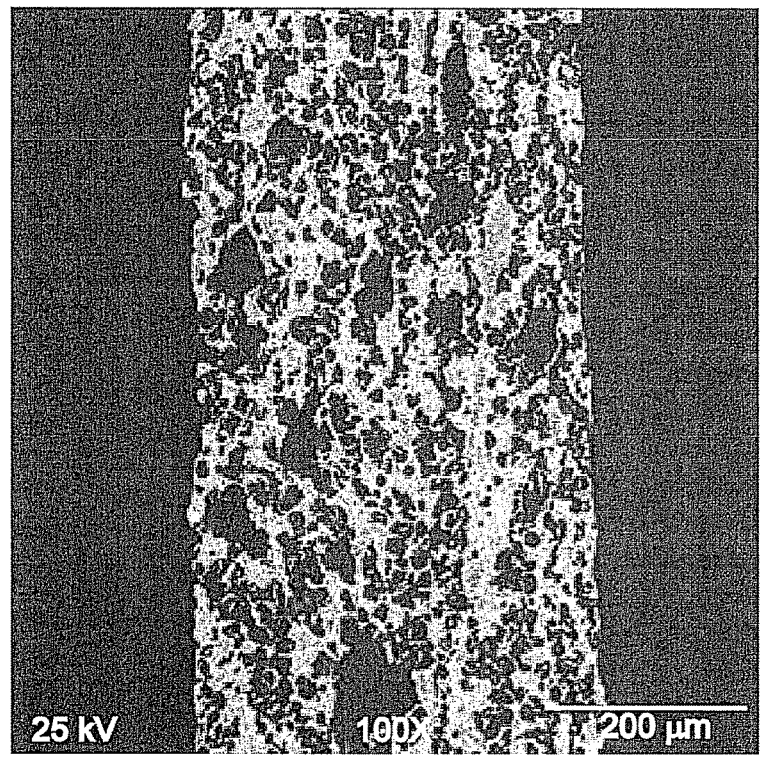
FIG. 4k is an SEM photomicrograph of a polished honeycomb wall longitudinal section of ceramic B1 obtained from fibrous and particulate alumina raw material in ratio 1:2 and with alumina excess by RAM extrusion.
Figure 4L:
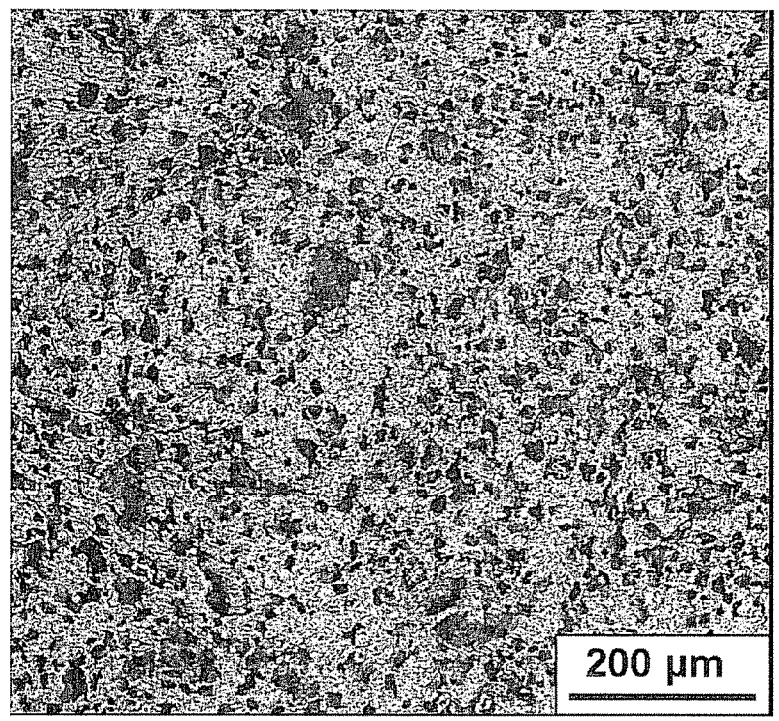
FIG. 4l is an SEM photomicrograph of an as fired honeycomb wall surface of ceramic P2 obtained from coarse particulate alumina raw material by RAM extrusion.
Figure 4M:
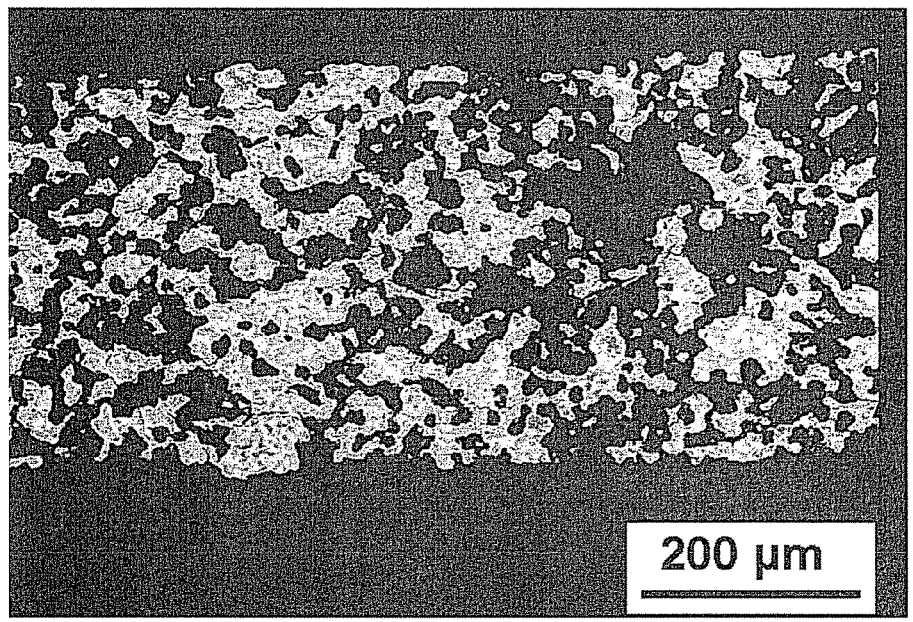
FIG. 4m is an SEM photomicrograph of a polished honeycomb wall cross section of ceramic P2 obtained from coarse particulate alumina raw material by RAM extrusion.
Figure 4N:
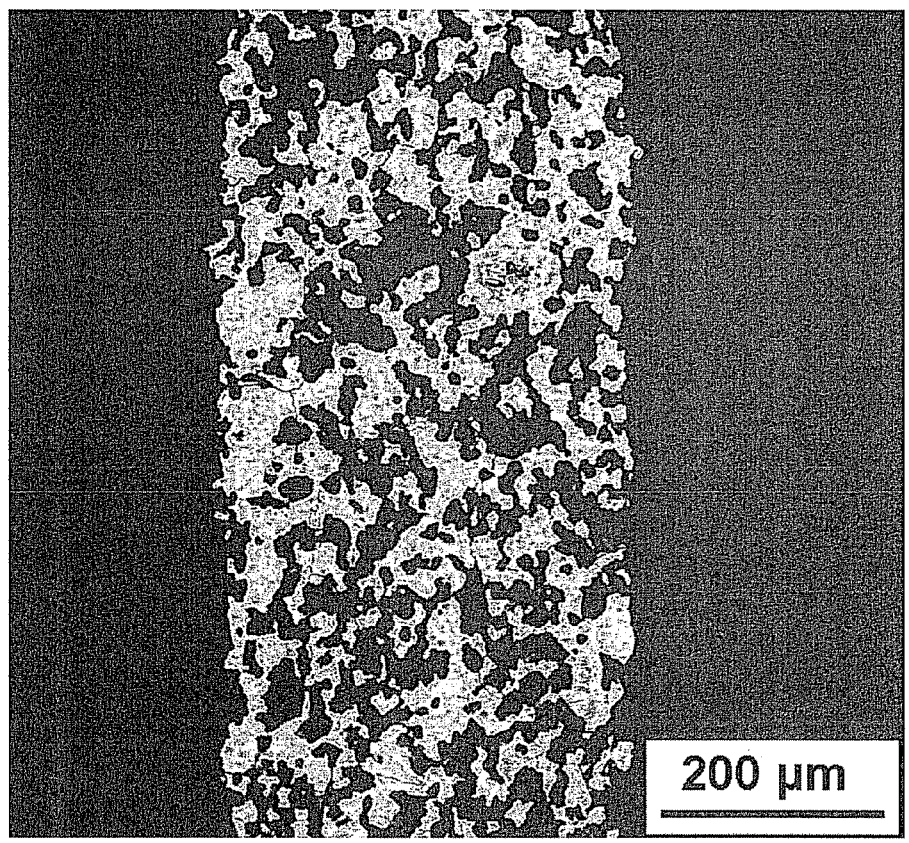

FIGS. 4a-4n show views of various honeycomb wall microstructures for materials obtained with different ratios of particulate to fibrous alumina raw material and by different forming processes.

FIG. 4a is an SEM photomicrograph of an as-fired pellet surface of ceramic A16 obtained from fibrous alumina raw material by compaction. FIG. 4b is an SEM photomicrograph of a polished wall longitudinal section parallel to the direction of compaction force of ceramic A16 obtained from fibrous alumina raw material by compaction.

FIG. 4c is an SEM photomicrograph of an as fired honeycomb wall surface of ceramic C4 obtained from fibrous alumina raw material by RAM extrusion. FIG. 4d is an SEM photomicrograph of a polished honeycomb wall cross section of ceramic C4 obtained from fibrous alumina batch raw material by RAM extrusion. FIG. 4e is an SEM photomicrograph of a polished honeycomb wall longitudinal section of ceramic C4 obtained from fibrous alumina raw material by RAM extrusion. FIG. 4f is an SEM photomicrograph of an as fired honeycomb wall surface of ceramic CT1 obtained from fibrous alumina batch raw material by twin screw extrusion. FIG. 4g is an SEM photomicrograph of a polished honeycomb wall cross section of ceramic CT1 obtained from fibrous alumina batch raw material by twin screw extrusion. FIG. 4h is an SEM photomicrograph of a polished honeycomb wall longitudinal section of ceramic CT1 obtained from fibrous alumina batch raw material by twin extrusion. FIG. 4i is an SEM photomicrograph of an as fired honeycomb wall surface of ceramic B1 obtained from fibrous and particulate alumina batch raw material in approximate ratio 1:2 (see Table 2) and with alumina excess by RAM extrusion. FIG. 4j is an SEM photomicrograph of a polished honeycomb wall cross section of ceramic B1 obtained from fibrous and particulate alumina raw material in ratio 1:2 and with alumina excess by RAM extrusion. FIG. 4k is an SEM photomicrograph of a polished honeycomb wall longitudinal section of ceramic B1 obtained from fibrous and particulate alumina batch raw material in ratio 1:2 and with alumina excess by RAM extrusion. FIG. 4l is an SEM photomicrograph of an as fired honeycomb wall surface of ceramic P2 obtained from coarse particulate alumina raw material by RAM extrusion. FIG. 4m is an SEM photomicrograph of a polished honeycomb wall cross section of ceramic P2 obtained from coarse particulate alumina batch raw material by RAM extrusion. FIG. 4n is an SEM photomicrograph of a polished honeycomb wall longitudinal section of ceramic P2 obtained from coarse particulate alumina raw material by RAM extrusion.

Figure 4O:
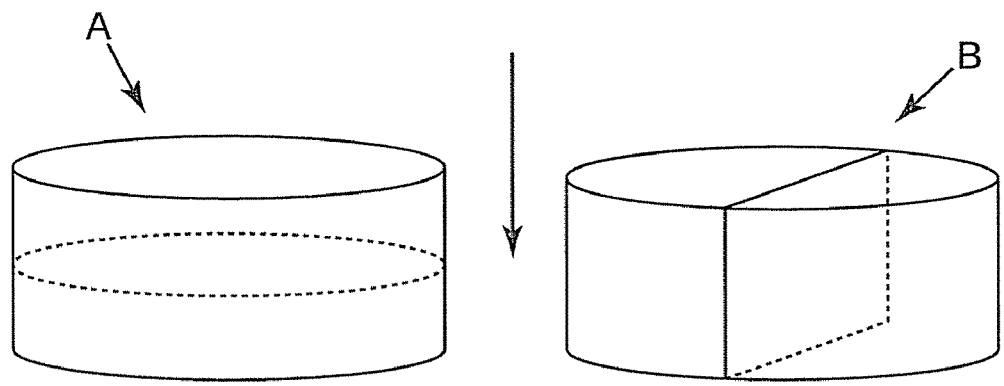
FIG. 4o is a schematic drawing showing (A) a section in a plane perpendicular to the direction of compaction and (B) a section in a plane parallel to the direction of compaction (arrow), of a pressed or compacted pellet such as by RAM extrusion.

FIG. 4o is a schematic drawing showing (A) a section in a plane perpendicular to the direction of compaction and (B) a section in a plane parallel to the direction of compaction (arrow), of a pressed or compacted pellet such as by RAM extrusion.

Figure 4P:
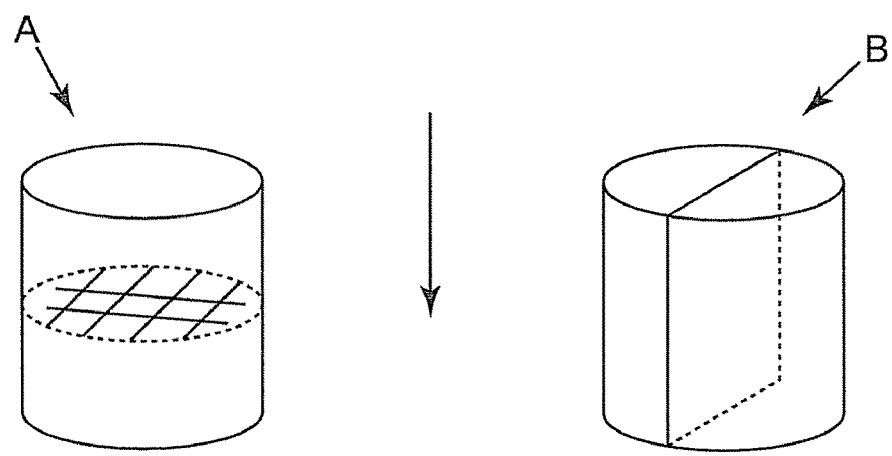
FIG. 4p is a schematic drawing showing (A) a section in a plane perpendicular to the direction of extrusion and (B) a section in a plane parallel to the direction of extrusion (arrow), of an extruded part (e.g. honeycomb structure), such as by twin screw extrusion.

FIG. 4p is a schematic drawing showing (A) a section in a plane perpendicular to the direction of extrusion and (B) a section in a plane parallel to the direction of extrusion (arrow), of an extruded part (e.g. honeycomb structure), such as by twin screw extrusion.

The properties of various materials were evaluated with various techniques and procedures. The phases present in the fired ceramic parts were identified by X-ray diffraction (XRD). A Philips PW1830 diffractometer (Co K$\alpha$ radiation) was used for X-ray diffraction. Spectra were typically acquired from 20 to 100° (2$\theta$). Rietveld refinement was used for quantification of the phase contributions.

Standard scanning electron microscopy, SEM, characterization was conducted on honeycomb wall surfaces and polished honeycomb wall longitudinal cross sections (cut in the direction of the honeycomb channels) and polished honeycomb cross sections (cut perpendicular to the honeycomb channels). For the observation of polished sections, the fired ware was infiltrated with epoxy, sliced and polished. The spatial distribution of porosity and phases in presence at a microscopic level was visualized on polished sample cross sections. The material porosity was evaluated by SEM image treatment techniques, listed in Table 5 as PSEM in %. PSEM was used to determine the spatial anisotropy in the porosity distribution. SEM image treatment also provided an average pore size daverage. For some samples, average pore surface/pore volume ratios ("pore-surf/vol") have also been derived from the images by image treatment. SEM was also used to acquire images of the pore shape distribution, which was then quantified to derive a pore anisotropy factor for the porosity. High resolution SEM was used to assess details of the anisotropic microstructure and the phase distribution.

Global texture of the phases present was derived by scanning electron microscopy (SEM) from large scale electron backscattered diffraction (EBSD) mapping on large polished long sections and cross sections of the fired ceramic part and then comparing the intensity distributions of selected crystallographic directions of the aluminum titanate and other phases in the axial and tangential direction of the honeycomb.

Chemical composition of the different phases and elemental distributions were obtained from (qualitative) analysis and elemental mapping by energy dispersive X-ray spectroscopy on the SEM.

Unless otherwise noted, porosity, median pore diameter and pore size distribution corresponds to measurements determined with a mercury intrusion porosimeter. Values reported herein were obtained from an Autopore IV 9500 porosimeter with software from Micromeritics. The mercury intrusion porosimetry method uses the capillary law with non-wetting liquid and cylindrical pores as may be expressed with the Washburn equation (i).

$$D=-(1/P)4y \cos \varnothing \qquad (i),$$

where D is the pore diameter, P is the applied pressure, y is the surface tension and $\varnothing$ is the contact angle. The volume of mercury is directly proportional to the pressure.

Data reduction used the differential and log differential to calculate the first derivative of the cumulative specific intrusion volume as a function of calculated log diameter.

Mercury porosimetry can be used to calculate the permeability. Permeability is the gas flow rate through a material under applied pressure. In the Autopore device, pressure is increased and the mercury fills smaller and smaller pores until a critical pressure is reached where the mercury spans the sample, as may be expressed with the equation (ii) and reported in millidarcys.

$$k=1/226(L_c)^2 \sigma/\sigma_o \qquad (ii),$$

where $\sigma$ is the conductivity at length Lc and $\sigma_o$ is the conductance in the pore. The mercury porosity data can further be used to deduce a tortuosity. The tortuosity factor characterizes the efficiency of gas interaction with the surface during its transport through a porous medium. Tortuosity is strongly dependent on the pore interconnectity. The gas interaction with the material internal surface is the higher the larger the tortuosity factor is. J. Hager (PhD thesis, Lund University, Sweden 1999) derived an expression for material permeability based on a capillary bundle model in which pores are homogeneously distributed in random directions. Using the Hagen-Poiseuille correlation for fluid flow in cylindrical geometries, and making substitutions with measurable parameters, and combining with Darcy's law, an expression can be derived for material permeability in terms of total pore volume, material density, pore volume distribution by pore size, and material tortuosity. The total pore volume, material density, and pore volume distribution by pore size are obtainable from mercury porosimetry tests. Katz and Thompson also derived an expression for material permeability based on measurements obtainable from mercury porosimetry and which does not depend on knowledge of material tortuosity. Combining the Hager and Katz-Thompson expressions provides a means for determining tortuosity from data collected by mercury porosimetry.

Thermal expansion was measured for bar-shaped samples with dimension 0.25"×0.25"×2" during heating from room temperature to 1200° C. at a rate of 4 C/min and subsequent cooling to room temperature. Unless otherwise noted herein, the longitudinal axis of the test bars was oriented in the direction of the honeycomb channels, thus providing the thermal expansion in the axial direction of the honeycomb parts. Unless otherwise noted herein, room temperature as stated herein refers to 25° C.

Average thermal expansion coefficients for various temperature ranges are listed in Table 5, $CTE^{20-800}$ in $K^{-1}$, the average thermal expansion coefficient from room temperature to 800 C., defined as L(800° C.)-L(20° C.)/780° C. as average thermal expansion coefficient in the temperature range from room temperature to 800° C., $CTE^{20-1000}$ in $K^{-1}$, the average thermal expansion coefficient from room temperature to 1000° C., defined as L(1000° C.)-L(20° C.)/980° C. as average thermal expansion coefficient in the temperature range from room temperature to 1000° C., $CTE^{500-900}$ in $K^{-1}$, the average thermal expansion coefficient from 500 to 900° C., defined as L(900° C.)-L(500° C.)/400° C. as average thermal expansion coefficient in the temperature range from 500° C. to 800° C. $CTE^{500-900}$ can be a relevant parameter for evaluating or characterizing ceramic articles and in particular honeycomb parts for exhaust after treatments in the automotive vehicle, where the honeycomb part is subjected to severe rapid temperature changes and thus the temperature range from 500-900° C. would represent a frequently encountered operation temperature range for such parts.

Figure 5:
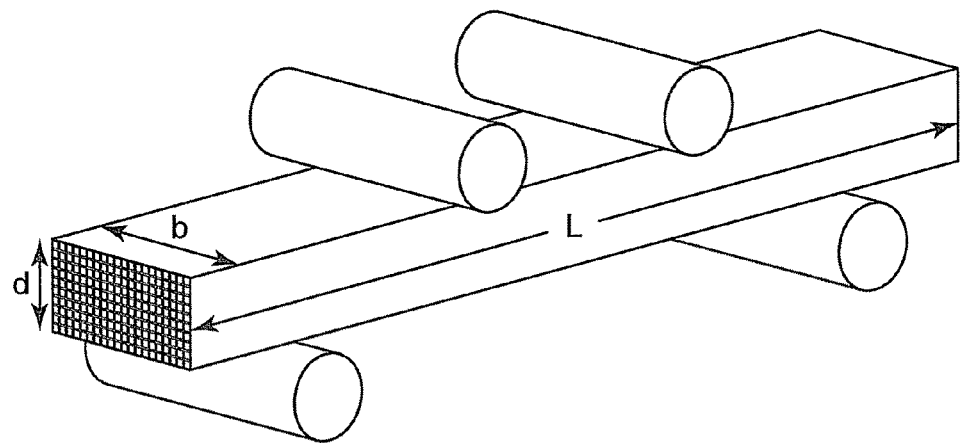
FIG. 5 is a schematic drawing showing the specimen geometry for the 4-point flexure tests for assessing modulus of rupture (MOR).

The strength of a ceramic can be tested using a transverse bending technique where test specimens are loaded to failure in using either three or four bending points. The maximum stress prior to failure is often referred to as the modulus of rupture or MOR. Unless otherwise noted, strength values are reported herein using a 4-point flexure. MOR, measured using four point flexure with a lower span (L) of two inches (fifty and four fifths millimeter) and an upper span (U) of three quarters of an inch (nineteen millimeters). Referring to FIG. 5, the specimen geometry for the 4-point flexure tests was two and one half inches (sixty three and one half millimeters) in length, one half inch (twelve and seven tenths millimeters) in width (b) and one quarter inch (six and two fifths millimeters) thick (d). The force-measuring system used was equipped with a read-out of the maximum force (P) and a calibrated load cell. The MOR value was calculated using the well known flexure strength equation (Equation 1) for a rectangular specimen.

$$\sigma_{4-point,MOR} = \frac{3P(L-U)}{2bd^2} \qquad \text{Equation 1}$$

All specimens tested had a square cellular (honeycomb) structure with the channels in the direction of the length of the honeycomb. Table 5 reports MOR in N/m² and in psi, and is representative of the material specifically as formed into a honeycomb structure. The material strength independent of the structure of the body, often referred to as the wall strength ($\sigma_{wall}$), was determined by modifying the traditional MOR equation to account for the cellular structure of the honeycomb test bar (Equation 2, 3).

$$\sigma_{wall} = \frac{PLd}{16I_t} \qquad \text{Equation 2}$$

$$I_t = \frac{bd^3}{12} - \left[\frac{mn(p-t)^3}{12} + \frac{mp^2(p-t)^2}{4}\sum_i^n (2i-n-1)^2\right] \qquad \text{Equation 3}$$

where P is the maximum force, L is the lower span length, b is the width of the test bar and d is the thickness of the test bar, m is the number of cells in the width direction, n is the number of cells in the thickness direction, t is the wall thickness and p is the cell pitch. See ASTM standard C1674-08.

Figure 6:
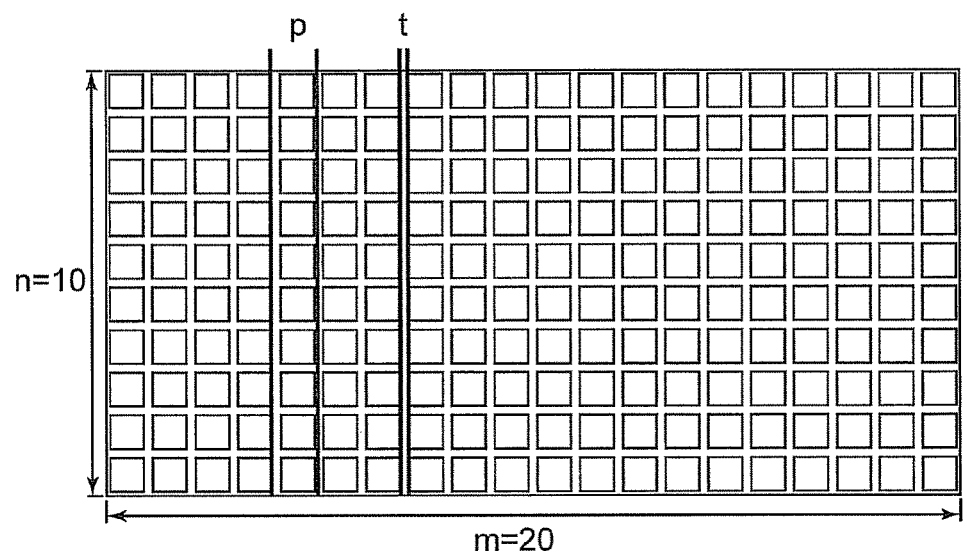
FIG. 6 schematically illustrates a portion of a honeycomb structure and various variables used to assess wall strength.

FIG. 6 indicates the parameters used in the equation used to assess the wall strength.

Bar-shaped samples with dimension 5"×1"×0.5" and the longitudinal axis being oriented in the direction of the honeycomb channels were used to measure the elastic modulus by flexural resonance frequency. Samples were heated to 1200° C. and cooled back to room temperature. For each temperature the elastic modulus was directly derived from the resonance frequency and normalized for sample geometry and weight per ASTM C 1198-01. The elastic modulus of a microcracked ceramic is lower than that of a corresponding non-microcracked ceramic. The elastic modulus obtained in a heating and a cooling cycle for microcracked ceramics shows an extensive hysteresis that is related to the fact that during heating to temperatures above about 700° C. microcracks in the material start to close, which yields an increase in the elastic modulus during heating in the temperature range from about 700° C. to 1200° C. At around 1200° C., a portion of the microcracks is typically already closed in the aluminum titanate-based materials, and ceramic with lesser microcracks is obtained. In the cooling cycle from 1200° C. to room temperature, the elastic modulus curve follows initially that of the ceramic with partially closed microcracks and thus a lowered microcrack density, characterized by a straight line with a slightly negative slope, the slope of which is determined by the intrinsic elastic modulus of the ceramic with the lowered microcrack density. When a critical local stress is reached during cooling, further microcracks start to form and/or reopen during further cooling. The onset of additional microcracking during cooling is observed in the elastic modulus cooling curve for temperatures below 900° C. The elastic modulus then decreases with decreasing temperature, reflecting increasing microcracking. At room temperature, the elastic modulus of the cooling curve finally reaches the original starting value of the heating curve, which is the room temperature elastic modulus of the microcracked ceramic $E_{mc}^{RT}$. The degree of hysteresis between the heating and cooling elastic modulus curves reflects the microcrack density change of the material at room temperature and the material at 1200 C. Unless otherwise noted, elastic modulus (EMOD) data is reported herein at room temperature (at 25° C.): $EMOD^{RT}$, at high temperature (1000 C): $EMOD^{1000C}$, or at different temperatures during cooling.

Strain tolerance can be derived from the strength of the material and its Young's modulus in order to describe the ability of a material to handle strain. The higher the strain tolerance, the less likely the material will fracture. The strain tolerance is independent of the honeycomb geometry and can directly be compared for parts with different cell densities or wall thickness. As used herein, for same cell and wall geometry the strain tolerance is proportional to MOR divided by EMOD, which is dimensionless, and is in the tables evaluated for room temperature.

The resistance to thermal shock can be a meaningful parameter for evaluating or characterizing a honeycomb part meant for exhaust after-treatment because the part undergoes severe thermal cycling during rapid heat up and cool down. The thermal shock resistance of a honeycomb structure improves with higher strength, lower elastic modulus and/or lower thermal expansion of its material. The thermal shock parameter, TSP, is a figure of merit for thermal shock resistance, where TSP=MOR/(E·CTE). To obtain a figure of merit for thermal shock resistance in the temperature range from 500-900 C, the following values were used: the modulus of rupture MOR in Pa at room temperature, elastic modulus E in Pa at 500° C., and the average coefficient of thermal expansion CTE in 1/K, from 500 to 900° C.

The anisotropic material disclosed herein can possess anisotropy in matter, or anisotropy in porosity, or both. A quantification method of anisotropy in matter and porosity spatial distribution within a honeycomb cell wall is presented below.

Characteristic numbers for the anisotropic distribution of matter and porosity have been derived from SEM images of polished wall long and wall cross sections.

Sample preparation: Polished wall cross sections of fired, extruded honeycomb parts were obtained by infiltrating the honeycomb with epoxy, cutting the honeycomb perpendicular to the extrusion direction (honeycomb axis) and polishing the cut surface with a diamond medium to a final polish of 3 micrometers.

Polished wall long sections of fired, extruded honeycomb parts were obtained by cutting out a single wall of the honeycomb, infiltrating the honeycomb with epoxy, grinding the honeycomb down to half of its thickness and polishing the honeycomb with a diamond medium to a final polish of 3 micrometers.

Image acquisition in the SEM: The polished wall cross and long sections were imaged by scanning electron microscopy (SEM) by backscattered electrons (BSE) using an acceleration voltage of 25 KV. For both sections, images were acquired at a magnification of 150 times with an image resolution of at least 0.795 µm per pixel and an accuracy of ±2 pixels (1.590 µm) in image size.

Each image was scanned using an (840×2) pixels×(360×2) pixels scanning area of interest. 180 scan lines across the web and 360 scan lines along the web were taken.

Image treatment procedure: An image treatment program such as, for example, Image Pro, can be used and applied to the selected area on each image. The area is chosen so that it is within the inside of the polished wall section and does not include the wall surface. The area is also chosen to be not a web cross section. The image definition is chosen to be at least (840×2) pixels×(360×2) pixels. The area is spanned by an x-direction and a y-direction. Results reported below were obtained using Image Pro image treatment program.

To obtain the cross sectional—direction 1—factors, the selected image area is divided in the direction perpendicular to that direction 1 into bands of 2 pixels in width. The bands are adjacent, do not overlap and their sum covers the entire image. For each band, the length of all individual pore and matter (solid) segments is measured (using black-white contrast distinction in the image treatment). This is repeated for all bands. The length of each individual pore segment in the image is reported in a distribution plot of the pore length on the cross section in direction 1. The distribution is characterized by a mean pore length in the direction 1, d50pore-cross-dir 1. Other characteristics of the distribution can also be derived such as the width of the distribution and other dx, where x can be, for example, a value from 1 to 99 (and not just "d50"). The length of each individual matter segment in the image is reported in a distribution plot of the matter segment length on the cross section in direction1. The distribution is characterized by a mean matter segment length in the direction 1, d50matter-cross-dir1.

The procedure is repeated in the direction perpendicular to direction 1, i.e. direction 2, on the cross sectional image to determine the cross sectional—direction 2—factors. Again the length of each individual pore segment in the image is reported in a distribution plot of the pore length on the cross section in direction 2 and the length of each individual matter segment in the image is reported in a distribution plot of the matter segment length on the cross section in direction 2. The pore segment length distribution is characterized by a mean pore length in the direction 2, d50pore-cross-dir2. Other characteristics of the distribution can also be derived such as the width of the distribution and other dx, where x can be, for example, a value from 1 to 99 (and not just "d50").

The matter segment length distribution is characterized by a mean matter segment length in the direction 2, d50matter-cross-dir2.

Anisotropy factors are defined for pore and matter distribution in the cross section:

$$Af\text{-pore-cross}=d50\text{pore-cross-dir1}/d50\text{pore-cross-dir2}$$

$$Af\text{-matter-cross}=d50\text{matter-cross-dir1}/d50\text{matter-cross-dir2}$$

To obtain the long sectional—in extrusion direction—factors, the selected image area is divided in the direction perpendicular to the extrusion direction, which is the honeycomb long axis and the wall long axis into bands of 2 pixels in width. The bands are adjacent, do not overlap and their sum covers the entire image. For each band, the length of all individual pore and matter (solid) segments is measured (using black-white contrast distinction in the image treatment). This is repeated for all bands. The length of each individual pore segment in the image is reported in a distribution plot of the pore length on the long section in extrusion direction. The distribution is characterized by a mean pore length in the direction of extrusion, d50pore-long-extrdir. Other characteristics of the distribution can also be derived such as the width of the distribution and other dx, where x can be, for example, a value from 1 to 99 (and not just "d50"). The length of each individual matter segment in the image is reported in a distribution plot of the matter segment length on the long section in extrusion direction. The distribution is characterized by a mean matter segment length in the extrusion direction, d50matter-long-extrdir.

The procedure is repeated in the direction perpendicular to extrusion direction, perpextr, on the long sectional image to determine the long sectional—perpextr direction—factors. Again the length of each individual pore segment in the image is reported in a distribution plot of the pore length on the long section in direction perpendicular to the extrusion and the length of each individual matter segment in the image is reported in a distribution plot of the matter segment length on the long section in the direction perpendicular to the extrusion. The pore segment length distribution is characterized by a mean pore length in the direction perpendicular to the extrusion, d50pore-long-perpextrdir. Other characteristics of the distribution can also be derived such as the width of the distribution and other dx, where x can be, for example, a value from 1 to 99 (and not just "d50").

The matter segment length distribution is characterized by a mean matter segment length in the direction perpendicular to the extrusion, d50matter-long-perpextrdir.

Anisotropy factors are defined for pore and matter distribution in the long section as ratio of the above derived numbers in extrusion direction over perpendicular to extrusion direction:

$$Af\text{-pore-long}=d50\text{pore-long-extrdir}/d50\text{pore-long-perpextrdir}$$

$$Af\text{-matter-long}=d50\text{matter-long-extrdir}/d50\text{matter-cross-perpextrdir}$$

For a completely isotropic microstructure, the four ratios Af-matter-long, Af-pore-long, Af-matter-cross, Af-pore-cross are all equal to 1.

For an anisotropy in the microstructure, one or several factors deviate from 1.

Anisotropy in the matter distribution is characterized by a deviation from 1 of the factors Af-matter-long or Af-matter-cross. The larger the deviation from 1, the larger is the anisotropy.

Anisotropy in the spatial distribution of the porosity is characterized by a deviation from one of the factors Af-pore-long or Af-pore-cross. The larger the deviation from 1, the larger is the anisotropy. A simplified illustration can be provided by a material with a set of individual pores having a simple shape. For example, for spherical pores, the porosity is isotropic with the anisotropy ratios being 1 in both directions. For ellipsoidal pores with their long axis being preferentially oriented in a certain direction of space, the porosity distribution in space becomes anisotropic and the ratios deviate from 1 The anisotropy and the deviation from 1 is larger the more the ellipsoids are preferentially aligned in space and the larger the average aspect ratio of the ellipsoids is. These simple examples are only meant as illustrations. In materials having non-idealized pore shapes, the pores do not have a simple shape, and may be strongly interconnected, and therefore the more complicated image analysis described above is needed.

For the materials comprising anisotropic microstructure as disclosed herein, both anisotropic microstructure and crystallographic texture of grains with anisotropy in their thermal lattice expansion help to provide high toughness to the part and help to reduce the propagation of cracks and formation of macrocracks. The following tables show the high strength of the material disclosed herein.

Table 3 shows examples of ceramic articles formed by 1" ram extrusion and subsequent firing from particulate alumina (no fiber) batches.

TABLE 3

| | Example No. | | | |
|---|---|---|---|---|
| | P1 | P2 | P3 | P4 |
| type of alumina raw material in batch | Particulate A1 | Particulate A1 | Particulate A1 | Particulate A1 |
| batch fiber content % (of inorganic oxides) | 0 | 0 | 0 | 0 |
| excess alumina fiber in batch (%) (compared to particulate alumina batch P1) | 0 | 0 | 0 | 0 |
| Firing temperature (° C.) | 1410 | 1410 | 1410 | 1410 |
| Hold time (hours) | 15 | 15 | 15 | 15 |
| Cell Density | 169 | 169 | 169 | 169 |
| Wall Thickness ($10^{-3}$ inches) | 16 | 16 | 16 | 16 |
| CFA | 0.373 | 0.373 | 0.373 | 0.373 |
| % Porosity | 29.3 | 51.81 | 48.40 | 50.81 |
| d1 (um) | 0.15 | 3.87 | 0.65 | 1.95 |
| d2 (um) | 0.25 | 7.11 | 5.42 | 4.48 |
| d5 (um) | 0.53 | 8.79 | 8.10 | 7.24 |
| d10 (um) | 1.09 | 10.08 | 10.15 | 9.09 |
| d25 (um) | 4.94 | 11.91 | 13.46 | 12.57 |
| d50 (um) | 8.58 | 13.72 | 16.31 | 15.77 |
| d75 (um) | 12.17 | 15.79 | 19.12 | 18.66 |
| d90 (um) | 19.53 | 23.41 | 27.99 | 26.33 |
| d95 (um) | 38.41 | 48.96 | 56.04 | 46.60 |
| d98 (um) | 126.17 | 129.54 | 152.00 | 115.59 |
| d99 (um) | 198.23 | 186.79 | 224.12 | 175.74 |
| (d50 − d10)/d50 | 0.87 | 0.27 | 0.38 | 0.42 |
| (d90 − d10)/d50 | 2.15 | 0.97 | 1.09 | 1.09 |
| Polished wall long section porosity (SEM) (%) | | 48.92 | 47.30 | |
| Wall surface porosity (SEM) (%) | | 26.34 | 15.7 | |
| Surface/Bulk porosity (SEM) | | 0.54 | 0.33 | |
| Permeability (mdarcy) | 85.2 | 488 | 613 | 573 |
| tortuosity factor | 11.7 | 8.2 | 8.3 | 7.82 |
| $CTE^{25-800°}$ C. ($10^{-7}$/K) | | 2.10 | | 1.6 |
| $CTE^{25-1000°}$ C. ($10^{-7}$/K) | | 5.5 | | 5.7 |
| $CTE^{500-900°}$ C. ($10^{-7}$/K) | | 11.8 | | 4.2 |
| MOR (psi) | | 283 | 272 | 271 |
| MOR (MPa) | | 1.95 | 1.87 | 1.87 |
| MOR [psi]/(1 − 0.01 × porosity [in %]) | | 587 | 527 | 551 |
| MOR [MPa]/(1 − 0.01 × | | 4.05 | 3.62 | 3.80 |

TABLE 3-continued

| | Example No. | | | |
|---|---|---|---|---|
| | P1 | P2 | P3 | P4 |
| porosity [in %]) | | | | |
| E-mod at 25° C. ($10^5$ psi) | | | 2.52 | 2.81 |
| $\text{Emod}^{25°\,C.}$ (MPa) | | | 1737.62 | |
| $\text{Emod}^{900°\,C.}$ ($10^5$ psi) | | | 6.17 | 6.5 |
| $\text{Emod}^{1000°\,C.}$ ($10^5$ psi) | | | 8.84 | 9.01 |
| $\text{Emod}^{1000°\,C.}$ / $\text{Emod}^{25°\,C.}$ | | | 3.51 | |

TABLE 3-continued

| | Example No. | | | |
|---|---|---|---|---|
| | P1 | P2 | P3 | P4 |
| (MOR/Emod) at 25° C. (in %) | | | 1.08E−01 | 9.64E−02 |

Table 4 shows examples of properties of ceramic honeycomb extruded by 1″ ram extrusion from batches with mixed particulate and fibrous alumina.

TABLE 4

| | Example No. | | | | | | | | |
|---|---|---|---|---|---|---|---|---|---|
| | B1 | B2 | B3 | B4 | B5 | B6 | B7 | B8 | B9 |
| type of alumina raw material in batch | part & fib F1 | part & fib F1 | part & fib F1 | part & fib F1 | part & fib F1 | part & fib F1 | part & fib F1 | part & fib F1 | particulate & fibF1 |
| batch fiber content % (of inorganic oxides) | 15 | 20 | 10 | 10 | 20 | 10 | 15 | 15 | 20 |
| excess alumina fiber in batch (%) (compared to particulate alumina batch compo) | 5 | | | | | | | | |
| Firing temperature (° C.) | 1430 | 1410 | 1410 | 1410 | 1410 | 1410 | 1410 | 1410 | 1410 |
| Hold time (hours) | 15 | 15 | 15 | 15 | 15 | 15 | 15 | 15 | 15 |
| Cell Density | 169 | 169 | 169 | 169 | 169 | 169 | 169 | 169 | 169 |
| Wall Thickness ($10^{-3}$ inches) | 16 | 16 | 16 | 16 | 16 | 16 | 16 | 16 | 16 |
| CFA | 0.373 | 0.373 | 0.373 | 0.373 | 0.373 | 0.373 | 0.373 | 0.373 | 0.373 |
| % Porosity | 51.68 | 51.59 | 51.54 | 54.61 | 56.22 | 52.07 | 51.51 | 50.34 | 53.5 |
| d1 (um) | 0.74 | 4.47 | 3.56 | 2.10 | 3.84 | 3.76 | 0.47 | 2.05 | 1.43 |
| d2 (um) | 6.74 | 6.29 | 6.35 | 4.64 | 5.06 | 4.43 | 2.26 | 2.97 | 2.01 |
| d5 (um) | 9.21 | 8.21 | 8.33 | 6.92 | 7.02 | 5.34 | 3.66 | 3.87 | 2.96 |
| d10 (um) | 11.15 | 10.35 | 10.50 | 8.29 | 8.32 | 6.34 | 5.08 | 4.60 | 3.76 |
| d25 (um) | 14.02 | 14.12 | 14.00 | 10.25 | 10.24 | 7.84 | 8.33 | 5.58 | 5.02 |
| d50 (um) | 16.40 | 17.43 | 16.89 | 11.98 | 12.03 | 9.71 | 11.21 | 7.26 | 6.69 |
| d75 (um) | 19.00 | 20.42 | 19.83 | 13.66 | 14.11 | 11.54 | 13.44 | 9.07 | 8.47 |
| d90 (um) | 27.22 | 28.66 | 27.66 | 18.82 | 26.39 | 14.95 | 17.80 | 14.03 | 12.41 |
| d95 (um) | 51.36 | 56.03 | 45.02 | 42.75 | 54.18 | 27.67 | 26.00 | 26.16 | 23.18 |
| d98 (um) | 126.24 | 152.05 | 108.24 | 123.85 | 132.99 | 98.95 | 64.18 | 58.62 | 68.63 |
| d99 (um) | 181.28 | 212.87 | 178.08 | 184.42 | 194.74 | 205.96 | 120.41 | 95.57 | 128.79 |
| (d50 − d10)/d50 | 0.32 | 0.41 | 0.38 | 0.31 | 0.31 | 0.35 | 0.55 | 0.37 | 0.44 |
| (d90 − d10)/d50 | 0.98 | 1.05 | 1.02 | 0.88 | 1.50 | 0.89 | 1.13 | 1.30 | 1.29 |
| Polished wall long section porosity (SEM) (%) | | | 50.70 | | | 57.00 | | 51.74 | 52.10 |
| Wall surface porosity (SEM) (%) | | | 29.8 | | | 27.27 | | 28.22 | 23.71 |
| Surface/Bulk porosity (SEM) | | | 0.59 | | | 0.48 | | 0.55 | 0.46 |
| Permeability (mdarcy) | 700 | 711 | 696 | 390 | 387 | 206 | 288 | 110.6 | 73.9 |
| tortuosity factor | 6.4 | 8.1 | 7.3 | 8.88 | 9.87 | | | | |
| $\text{CTE}^{25\text{-}800°\,C.}$ ($10^{-7}$/K) | 0.2 | −3 | −2.3 | 1.1 | −1.5 | 16 | 16.4 | 18.2 | 22.1 |
| $\text{CTE}^{25\text{-}1000°\,C.}$ ($10^{-7}$/K) | 4 | 0.7 | 1.7 | 5.3 | 2.7 | 20 | 20.4 | 22.3 | 24.9 |
| $\text{CTE}^{500\text{-}900°\,C.}$ ($10^{-7}$/K) | 10.5 | 9.4 | 9.8 | 7.5 | 7.9 | 11.78 | | 28.3 | 30.8 |
| MOR (psi) | 347 | 246 | 239 | 277 | 291 | | 563 | 416 | 498 |
| MOR (MPa) | 2.39 | 1.69 | 1.65 | 1.91 | 2.01 | | 3.88 | 2.87 | 3.43 |
| MOR [psi]/(1 − 0.01 × porosity [%]) | 718 | 508 | 493 | 610 | 665 | | 1161 | 838 | 1071 |
| MOR [MPa]/(1 − 0.01 × porosity [%]) | 4.95 | 3.49 | 3.40 | 4.21 | 4.59 | | 8.00 | 5.78 | 7.38 |
| E-mod at 25° C. ($10^5$ psi) | 3.00 | 3.4 | 2.7 | 2.85 | 3.16 | | | | |

TABLE 4-continued

| | Example No. | | | | | | | | |
|---|---|---|---|---|---|---|---|---|---|
| | B1 | B2 | B3 | B4 | B5 | B6 | B7 | B8 | B9 |
| Emod$^{25°C.}$ (MPa) | 2068 | 2344 | 1861 | | | | | | |
| Emod$^{900°C.}$ (10$^5$ psi) | 6.01 | 7.02 | 5.83 | 6.19 | 6.63 | | | | |
| Emod$^{1000°C.}$ (10$^5$ psi) | 8.34 | 9.47 | 8.09 | 8.56 | 9.02 | | | | |
| Emod$^{1000°C.}$/Emod$^{25°C.}$ | 2.78 | 2.79 | 3.00 | | | | | | |
| (MOR/Emod) at 25° C. (%) | 1.16E−01 | 7.24E−02 | 8.85E−02 | 9.72E−02 | 9.21E−02 | | | | |

Table 5 lists examples of properties of ceramic honeycomb extruded by 1" ram extrusion from batches with fibrous alumina (no particulate), CS pore former. C1 had no pore former in the batch. C4-C6 had an excess amount of alumina fiber in the batch.

TABLE 5

| | Example No. | | | | | |
|---|---|---|---|---|---|---|
| | C1 | C2 | C3 | C4 | C5 | C6 |
| type of alumina raw material in batch | Fibrous F1 | Fibrous F1 | Fibrous F1 | fibrous F1 | fibrous F1 | Fibrous F1 |
| batch fiber content % (of inorganic oxides) | 46.57 | 46.57 | 48.01 | 51.57 | 51.57 | 66.57 |
| excess alumina fiber in batch (%) (compared to particulate alumina batch compo) | | | | 3.56 | 3.56 | 18.56 |
| Firing temperature (° C.) | 1410 | 1410 | 1410 | 1410 | 1410 | 1410 |
| Hold time (hours) | 15 | 15 | 15 | 15 | 15 | 15 |
| Cell Density | 169 | 169 | 169 | 169 | 169 | 169 |
| Wall Thickness (10$^{-3}$ inches) | 16 | 16 | 16 | 16 | 16 | 16 |
| CFA | 0.373 | 0.373 | 0.373 | 0.373 | 0.373 | 0.373 |
| % Porosity | 45.6 | 58.36 | 61.63 | 60.82 | 56.99 | 58.62 |
| d1 (um) | 0.64 | 4.15 | 2.46 | 3.25 | 2.79 | 3.45 |
| d2 (um) | 3.74 | 5.41 | 3.26 | 4.29 | 4.12 | 4.69 |
| d5 (um) | 4.93 | 7.30 | 4.79 | 5.99 | 5.69 | 6.37 |
| d10 (um) | 5.79 | 8.96 | 6.50 | 7.63 | 7.26 | 7.73 |
| d25 (um) | 7.35 | 11.68 | 9.56 | 10.43 | 9.80 | 10.02 |
| d50 (um) | 9.28 | 14.38 | 12.04 | 13.15 | 12.26 | 12.23 |
| d75 (um) | 11.53 | 16.75 | 13.84 | 15.30 | 14.49 | 14.14 |
| d90 (um) | 24.89 | 22.35 | 17.08 | 19.42 | 22.32 | 19.15 |
| d95 (um) | 79.17 | 46.74 | 31.91 | 37.35 | 40.13 | 49.04 |
| d98 (um) | 173.38 | 121.21 | 99.69 | 108.77 | 102.65 | 140.47 |
| d99 (um) | 227.55 | 185.65 | 167.17 | 180.91 | 170.35 | 197.14 |
| (d50 − d10)/d50 | 0.38 | 0.38 | 0.46 | 0.42 | 0.41 | 0.37 |
| (d90 − d10)/d50 | 2.06 | 0.93 | 0.88 | 0.90 | 1.23 | 0.93 |
| Polished wall long section porosity (SEM) (%) | | 59.50 | | 66.69 | 54.98 | |
| Wall surface porosity (SEM) (%) | | 37.39 | | 37.64 | 35.06 | |
| Surface/Bulk porosity (SEM) | | 0.63 | | 0.56 | 0.64 | |
| Permeability (mdarcy) | 167 | 552 | 414 | 473 | 386 | 401 |
| tortuosity factor | 11.3 | 8.7 | 8.9 | 9 | 8.5 | 8.1 |
| CTE$^{25-800°}$ C. (10$^{-7}$/K) | 21.4 | −1.1 | 4 | 9 | 5.3 | 6.9 |
| CTE$^{25-1000°}$ C. (10$^{-7}$/K) | 24.7 | 3.5 | 6.7 | 12.6 | 8.7 | 9.3 |
| CTE$^{500-900°}$ C. (10$^{-7}$/K) | 31 | 9.5 | 12.8 | 18.7 | 14.9 | 15.9 |
| MOR (psi) | 429 | 308 | 372 | 335 | 325 | 285 |
| MOR (MPa) | 3.00 | 2.12 | 2.56 | 2.31 | 2.24 | 1.97 |
| MOR [psi]/(1 − 0.01 × porosity [%]) | 789 | 740 | 970 | 855 | 756 | 689 |
| MOR [MPa]/(1 − 0.01 × porosity [%]) | 5.51 | 5.09 | 6.67 | 5.90 | 5.21 | 4.76 |
| E-mod at 25° C. (10$^5$ psi) | | 2.77 | | | 3.15 | |
| Emod$^{25°C.}$ (MPa) | | 1910 | | | 2172 | |

TABLE 5-continued

|  | \multicolumn{6}{c}{Example No.} | | | | | |
| --- | --- | --- | --- | --- | --- | --- |
|  | C1 | C2 | C3 | C4 | C5 | C6 |
| $Emod^{900° C.}$ ($10^5$ psi) |  | 5.73 |  |  | 6.05 |  |
| $Emod^{1000° C.}$ ($10^5$ psi) |  | 7.54 |  |  | 7.87 |  |
| $Emod^{1000° C.}$/$Emod^{25° C.}$ |  | 2.72 |  |  | 2.50 |  |
| (MOR/Emod) at 25° C. (%) |  | 1.11E−01 |  |  | 1.03E−01 |  |

Table 6 shows additional examples of properties of ceramic honeycomb extruded by 1" ram extrusion from batches with fibrous alumina (no particulate), CS pore former. C9 and C10 had higher levels of corn starch.

TABLE 6

|  | \multicolumn{4}{c}{Example No.} | | | |
| --- | --- | --- | --- | --- |
|  | C7 | C8 | C9 | C10 |
| type of alumina raw material in batch | Fibrous F1 | Fibrous F1 | fibrous F1 | Fibrous F1 |
| batch fiber content % (of inorganic oxides) | 51.57 | 48.01 | 48.01 | 48.01 |
| excess alumina fiber in batch (%) (compared to particulate alumina batch compo) | 3.56 |  |  |  |
| Firing temperature (° C.) | 1410 | 1410 | 1410 | 1410 |
| Hold time (hours) | 15 | 15 | 15 | 15 |
| Cell Density | 169 | 169 | 169 | 169 |
| Wall Thickness ($10^{-3}$ inches) | 16 | 16 | 16 | 16 |
| CFA | 0.373 | 0.373 | 0.373 | 0.373 |
| % Porosity |  | 59.11 | 58.90 | 60.80 |
| d1 (um) |  | 2.69 | 3.14 | 4.04 |
| d2 (um) |  | 3.72 | 4.36 | 5.19 |
| d5 (um) |  | 5.06 | 5.70 | 6.82 |
| d10 (um) |  | 6.73 | 7.21 | 8.12 |
| d25 (um) |  | 9.28 | 10.89 | 9.97 |
| d50 (um) |  | 11.33 | 15.16 | 11.69 |
| d75 (um) |  | 12.45 | 18.89 | 13.58 |
| d90 (um) |  | 13.87 | 27.60 | 21.15 |
| d95 (um) |  | 18.55 | 55.90 | 56.19 |
| d98 (um) |  | 54.86 | 135.67 | 147.73 |
| d99 (um) |  | 97.56 | 205.16 | 211.91 |
| (d50 − d10)/d50 |  | 0.41 | 0.52 | 0.31 |
| (d90 − d10)/d50 |  | 0.63 | 1.35 | 1.12 |
| Permeability (mdarcy) |  | 374 | 580 | 408 |
| tortuosity factor |  | 6.95 | 8.35 | 9.64 |
| $CTE^{25-800°}$ C. ($10^{-7}$/K) |  | 7.4 | −6.5 |  |
| $CTE^{25-1000°}$ C. ($10^{-7}$/K) |  | 9.9 | −2.9 |  |
| $CTE^{500-900°}$ C. ($10^{-7}$/K) |  | 6.2 | 7.2 |  |
| MOR (psi) | 300 | 255 | 228 |  |
| MOR (MPa) | 2.07 | 1.76 | 1.57 |  |
| MOR [psi]/(1 − 0.01 × porosity [%]) | 300 | 624 | 555 |  |
| MOR [MPa]/(1 − 0.01 × porosity [%]) | 2.07 | 4.30 | 3.82 |  |
| E-mod at 25° C. ($10^5$ psi) | 3.74 |  |  |  |
| $Emod^{900° C.}$ ($10^5$ psi) | 7.29 |  |  |  |
| $Emod^{1000° C.}$ ($10^5$ psi) | 9.76 |  |  |  |
| $Emod^{1000° C.}$/$Emod^{25° C.}$ | 2.6 |  |  |  |
| (MOR/Emod) at 25° C. (%) | 8.02E−02 |  |  |  |

Table 7 shows examples of properties of ceramic honeycomb extruded by 1" ram extrusion from batches with fibrous alumina (no particulate), PS pore former. Various PS pore former levels were used.

TABLE 7

|  | \multicolumn{5}{c}{Example No.} | | | | |
| --- | --- | --- | --- | --- | --- |
|  | C11 | C12 | C13 | C14 | C15 |
| type of alumina raw material in batch | fibrous F1 | fibrous F1 | fibrous F1 | fibrous F1 | fibrous F1 |
| batch fiber content % (of inorganic oxides) | 48.01 | 48.01 | 48.01 | 48.01 | 48.01 |
| excess alumina fiber in batch (%) (compared to particulate alumina batch compo) |  |  |  |  |  |
| Firing temperature (° C.) | 1410 | 1410 | 1410 | 1410 |  |
| Hold time (hours) | 15 | 15 | 15 | 15 |  |
| Cell Density | 169 | 169 | 169 | 169 |  |
| Wall Thickness ($10^{-3}$ inches) | 16 | 16 | 16 | 16 |  |
| CFA | 0.373 | 0.373 | 0.373 | 0.373 |  |
| % Porosity |  | 61.14 | 60.77 | 65.51 | 69.07 |
| d1 (um) |  | 2.92 | 3.93 | 3.74 | 7.17 |
| d2 (um) |  | 3.74 | 5.23 | 6.42 | 8.68 |
| d5 (um) |  | 4.85 | 7.18 | 8.93 | 11.95 |
| d10 (um) |  | 6.43 | 9.18 | 11.68 | 15.14 |
| d25 (um) |  | 10.67 | 13.28 | 16.64 | 20.01 |

TABLE 7-continued

| | Example No. | | | | |
|---|---|---|---|---|---|
| | C11 | C12 | C13 | C14 | C15 |
| d50 (um) | | 16.16 | 17.33 | 20.63 | 23.72 |
| d75 (um) | | 20.42 | 20.79 | 24.01 | 27.27 |
| d90 (um) | | 31.91 | 33.59 | 32.75 | 37.12 |
| d95 (um) | | 58.85 | 80.04 | 64.03 | 65.45 |
| d98 (um) | | 131.88 | 172.54 | 153.47 | 141.62 |
| d99 (um) | | 192.32 | 238.98 | 210.23 | 195.92 |
| (d50 − d10)/d50 | | 0.60 | 0.47 | 0.43 | 0.36 |
| (d90 − d10)/d50 | | 0.63 | 1.35 | 1.12 | |
| Polished wall long section porosity (SEM) (%) | | 1.58 | 1.41 | 1.02 | 0.93 |
| Wall surface porosity (SEM) (%) | | | 60.10 | 65.24 | 66.10 |
| Surface/Bulk porosity (SEM) | | | 31.44 | | 31.4 |
| Permeability (mdarcy) | | | 0.52 | | 0.48 |
| tortuosity factor | | 653 | 822 | 1291 | 1845 |
| $CTE^{25-800°}$ C. $(10^{-7}/K)$ | −5.6 | 1.5 | −3.7 | −4.2 | −4.1 |
| $CTE^{25-1000°}$ C. $(10^{-7}/K)$ | −2.2 | 4.6 | −0.2 | −0.7 | −1.5 |
| $CTE^{500-900°}$ C. $(10^{-7}/K)$ | 6.9 | 10.8 | 7.4 | 9.1 | 7.9 |
| MOR (psi) | 297 | 275 | 237 | 210 | 178 |
| MOR (MPa) | 2.05 | 1.90 | 1.64 | 1.45 | 1.23 |
| MOR [psi]/(1 − 0.01 × porosity [%]) | 297 | 708 | 604 | 609 | 575 |
| MOR [MPa]/(1 − 0.01 × porosity [%]) | 2.05 | 4.89 | 4.18 | 4.20 | 3.98 |
| E-mod at 25° C. $(10^5 psi)$ | | | 3.06 | 2.62 | 2.26 |
| $Emod^{25°\ C.}$ (MPa) | | | 2109 | 1806 | 1558 |
| $Emod^{900°\ C.}$ $(10^5 psi)$ | | | 6.04 | 5.03 | 4.26 |
| $Emod^{1000°\ C.}$ $(10^5 psi)$ | | | 8.12 | 6.56 | 5.61 |
| $Emod^{1000°\ C.}/Emod^{25°\ C.}$ | | | 2.65 | 2.50 | 2.48 |
| (MOR/Emod) at 25° C. (%) | | | 7.75E−02 | 8.02E−02 | 7.88E−02 |

Table 8 shows examples of properties of ceramic honeycomb extruded by 1" ram extrusion from batches with fibrous alumina (no particulate), PS pore former. C16 included tall oil in the batch, and was not sieved. C17 had fiber excess in the batch. In C18, the fiber was pre-mulled. In C18 and C19, the fibers were different length (C19 was a long fiber) in the batch. C20 used no hydroxide. C21 yielded 3% feldspar.

TABLE 8

| | Example No. | | | | | |
|---|---|---|---|---|---|---|
| | C16 | C17 | C18 | C19 | C20 | C21 |
| type of alumina raw material in batch | Fibrous F1 | Fibrous F1 | Fibrous F1 | Fibrous F1 | Fibrous F1 | Fibrous F1 |
| batch fiber content % (of inorganic oxides) | 48.01 | 68.01 | 48.01 | 48.01 | 49.05 | 48.00 |
| excess alumina fiber in batch (%) (compared to particulate alumina batch compo) | | 20 | | | 10 | |
| Firing temperature (° C.) | 1410 | 1410 | 1410 | 1410 | 1410 | 1410 |
| Hold time (hours) | 15 | 15 | 15 | 15 | 15 | 15 |
| Cell Density | 169 | 169 | 169 | 169 | 169 | 169 |
| Wall Thickness $(10^{-3}$ inches) | 16 | 16 | 16 | 16 | 16 | 16 |
| CFA | 0.373 | 0.373 | 0.373 | 0.373 | 0.373 | 0.373 |
| % Porosity | 57.41 | 55.76 | 59.05 | 60.45 | 60.37 | 56.76 |
| d1 (um) | 3.46 | 1.92 | 1.77 | 3.00 | 1.79 | 1.54 |
| d2 (um) | 4.50 | 2.83 | 3.44 | 4.00 | 3.78 | 2.82 |
| d5 (um) | 6.13 | 3.79 | 4.81 | 5.38 | 5.35 | 3.75 |
| d10 (um) | 7.59 | 4.66 | 6.30 | 6.73 | 7.16 | 4.56 |
| d25 (um) | 11.31 | 6.45 | 9.62 | 10.48 | 11.22 | 6.15 |
| d50 (um) | 16.01 | 8.68 | 14.06 | 15.45 | 15.98 | 8.68 |
| d75 (um) | 20.04 | 10.66 | 17.13 | 19.42 | 19.60 | 10.46 |
| d90 (um) | 30.93 | 14.40 | 22.22 | 28.57 | 29.22 | 14.26 |
| d95 (um) | 58.73 | 32.08 | 39.23 | 50.66 | 57.62 | 30.87 |

TABLE 8-continued

| | Example No. | | | | | |
|---|---|---|---|---|---|---|
| | C16 | C17 | C18 | C19 | C20 | C21 |
| d98 (um) | 136.63 | 108.99 | 104.96 | 118.47 | 138.19 | 102.43 |
| d99 (um) | 193.60 | 180.67 | 164.15 | 184.82 | 198.71 | 168.66 |
| (d50 − d10)/d50 | 0.53 | 0.46 | 0.55 | 0.56 | 0.55 | 0.47 |
| (d90 − d10)/d50 | 1.46 | 1.12 | 1.13 | 1.41 | 1.38 | 1.12 |
| Permeability (mdarcy) | 625 | 176 | 510 | 595 | 659 | 186 |
| tortuosity factor | 8.47 | 11.8 | 8.05 | 9.02 | 8.42 | 11.6 |
| $CTE^{25\text{-}800°}$ C. $(10^{-7}/K)$ | −3.7 | 9.8 | −1 | −3.2 | −4.2 | −8.2 |
| $CTE^{25\text{-}1000°}$ C. $(10^{-7}/K)$ | −0.2 | 12.7 | 2.3 | 0 | −0.5 | −5 |
| $CTE^{500\text{-}900°}$ C. $(10^{-7}/K)$ | 7 | 6.5 | 6.9 | 6.7 | 7.6 | 6.9 |
| MOR (psi) | 284 | 386 | 250 | 278 | 241 | 355 |
| MOR (MPa) | 1.96 | 2.66 | 1.72 | 1.92 | 1.66 | 2.44 |
| MOR [psi]/(1 − 0.01 × porosity [%]) | 667 | 873 | 611 | 703 | 608 | 821 |
| MOR [MPa]/(1 − 0.01 × porosity [%]) | 4.60 | 6.01 | 4.20 | 4.85 | 4.19 | 5.64 |
| E-mod at 25° C. $(10^5$ psi) $Emod^{25°\,C.}$ (MPa) | 3.23 | 4.63 | | 3.27 | | |
| $Emod^{900°\,C.}$ $(10^5$ psi) | 6.48 | 7.41 | | 6.52 | | |
| $Emod^{1000°\,C.}$ $(10^5$ psi) | 9.08 | 9.25 | | 8.95 | | |
| $Emod^{1000°\,C.}/Emod^{25°\,C.}$ | 2.81 | 2.00 | | 2.73 | | |
| (MOR/Emod) at 25° C. (%) | 8.79E−02 | 8.34E−02 | | 8.50E−02 | | |

Table 9 shows further examples of properties of ceramic honeycomb extruded by 1" ram extrusion from batches with different types of fibrous alumina (no particulate), PS pore former.

TABLE 9

| | Example No. | | |
|---|---|---|---|
| | D1 | E1 | F1 |
| type of alumina raw material in batch | fibrous alumina F2 | part + fib F1 | part + fib F3 |
| batch fiber content % (of inorganic oxides) | 48.01 | 20.38 | 40.76 |
| excess alumina fiber in batch (%) (compared to particulate alumina batch compo) | | | |
| Firing temperature (° C.) | 1410 | 1410 | 1410 |
| Hold time (hours) | 15 | 15 | 15 |
| Cell Density | 169 | 169 | 169 |
| Wall Thickness $(10^{-3}$ inches) | 16 | 16 | 16 |
| CFA | 0.373 | 0.373 | 0.373 |
| % Porosity | 54.64 | 54.45 | 60.54 |
| d1 (um) | 2.65 | 2.13 | 3.08 |
| d2 (um) | 3.72 | 3.33 | 3.62 |
| d5 (um) | 4.81 | 4.51 | 4.47 |
| d10 (um) | 5.73 | 5.64 | 5.27 |
| d25 (um) | 8.08 | 8.21 | 7.13 |
| d50 (um) | 11.00 | 11.26 | 9.91 |
| d75 (um) | 13.59 | 13.94 | 12.28 |
| d90 (um) | 19.92 | 20.42 | 17.95 |
| d95 (um) | 50.07 | 38.36 | 38.36 |
| d98 (um) | 141.11 | 104.39 | 116.74 |
| d99 (um) | 212.39 | 175.53 | 186.00 |
| (d50 − d10)/d50 | 0.48 | 0.50 | 0.47 |
| (d90 − d10)/d50 | 1.29 | 1.31 | 1.28 |
| Permeability (mdarcy) | 275 | 289 | 249 |
| tortuosity factor | 10.9 | 9.7 | 10.9 |
| $CTE^{25\text{-}800°}$ C. $(10^{-7}/K)$ | −0.06 | 3 | 10.9 |
| $CTE^{25\text{-}1000°}$ C. $(10^{-7}/K)$ | 3 | 6.9 | 14.4 |
| $CTE^{500\text{-}900°}$ C. $(10^{-7}/K)$ | 6.9 | 7.2 | 6.9 |
| MOR (psi) | 378 | 237 | 241 |
| MOR (MPa) | 2.61 | 1.63 | 1.66 |
| MOR [psi]/(1 − 0.01 × porosity [%]) | 833 | 520 | 611 |
| MOR [MPa]/(1 − 0.01 × porosity [%]) | 5.75 | 3.58 | 4.21 |

TABLE 9-continued

| | Example No. | | |
|---|---|---|---|
| | D1 | E1 | F1 |
| E-mod at 25° C. $(10^5$ psi) | | | 2.16 |
| $Emod^{900°\,C.}$ $(10^5$ psi) | | | 4.7 |
| $Emod^{1000°\,C.}$ $(10^5$ psi) | | | 6.6 |
| (MOR/Emod) at 25° C. (%) | | | 1.10E−01 |

Table 10 shows further examples of properties of ceramic honeycomb extruded by 1" ram extrusion from batches with different types of fibrous alumina (no particulate), PS pore former, formed with thinner walls.

TABLE 10

| | F1 fiber Example No. | F1 fiber | F1 fiber |
|---|---|---|---|
| | C22 | C23 | C24 |
| type of alumina raw material in batch | fibrous | fibrous | fibrous |
| batch fiber content % (of inorganic oxides) | 48.01 | 48.01 | 48.01 |
| excess alumina fiber in batch (%) (compared to particulate alumina batch compo) | | | |
| Firing temperature (° C.) | 1410 | 1410 | 1410 |
| Hold time (hours) | 15 | 15 | 15 |
| Cell Density | 400 | 400 | 400 |
| Wall Thickness $(10^{-3}$ inches) | 8 | 8 | 5 |
| CFA | | 0.294 | 0.190 |
| % Porosity | 57.62 | 62.16 | 60.49 |
| d1 (um) | 3.35 | 2.32 | 3.25 |
| d2 (um) | 4.33 | 3.78 | 4.40 |
| d5 (um) | 5.70 | 5.13 | 6.09 |
| d10 (um) | 7.17 | 6.49 | 8.08 |
| d25 (um) | 10.81 | 10.86 | 12.88 |
| d50 (um) | 15.69 | 17.41 | 17.80 |
| d75 (um) | 21.14 | 23.71 | 24.58 |
| d90 (um) | 42.31 | 38.71 | 59.87 |
| d95 (um) | 97.59 | 75.09 | 126.49 |
| d98 (um) | 194.59 | 163.84 | 202.78 |
| d99 (um) | 251.05 | 225.21 | 243.95 |

TABLE 10-continued

|  | F1 fiber Example No. | | |
|---|---|---|---|
|  | C22 | C23 | C24 |
| (d50 − d10)/d50 | 0.54 | 0.63 | 0.55 |
| (d90 − d10)/d50 | 2.24 | 1.85 | 2.91 |
| Polished wall long section porosity (SEM) (%) |  | 61.90 | 58.10 |
| Wall surface porosity (SEM) (%) |  | 30.1 | 32.1 |
| Surface/Bulk porosity (SEM) |  | 0.49 | 0.55 |
| Permeability (mdarcy) | 566 | 748 | 745 |
| tortuosity factor | 11.2 | 9.3 | 10.5 |
| $CTE^{25-800°}$ C. $(10^{-7}/K)$ | −4.2 | −1.6 |  |
| $CTE^{25-1000°}$ C. $(10^{-7}/K)$ | −0.8 | 1.8 |  |
| $CTE^{500-900°}$ C. $(10^{-7}/K)$ | 7.2 | 9.2 |  |

TABLE 10-continued

|  | F1 fiber Example No. | | |
|---|---|---|---|
|  | C22 | C23 | C24 |
| MOR (psi) | 242 |  |  |
| MOR (MPa) | 1.67 |  |  |
| MOR [psi]/(1 − 0.01 × porosity [%]) | 571 |  |  |
| MOR [MPa]/(1 − 0.01 × porosity [%]) | 3.94 |  |  |

Table 11 shows Examples of 2" diameter ceramic honeycomb articles formed via twin screw extruder. The MOR values provided in the table are averages based on a number of MOR measurements. CT6 utilized a long batch milling time in a Littleford mixer before extrusion.

TABLE 11

|  | Example No. | | | | | | |
|---|---|---|---|---|---|---|---|
|  | PT1 | PT2 | CT1 | CT2 | CT3 | CT4 | CT6 |
| type of alumina raw material in batch | particle | particle | fibrous | fibrous | fibrous | fibrous | fibrous |
| alumina raw material | A | A | short fiber F1 | Long fiber F1 | Long fiber F1 | Long fiber F1 | F2 fiber |
| batch fiber content % (of inorganic oxides) | 0 | 0 | 46 | 48 | 48 | 48 | 48 |
| excess alumina fiber in batch (%) (compared to particulate alumina batch compo) |  |  |  |  |  |  |  |
| Firing temperature (° C.) | 1410 | 1410 | 1410 | 1410 | 1410 | 1410 | 1410 |
| Hold time (hours) | 15 | 15 | 15 | 15 | 15 | 15 | 15 |
| Green Cell Density | 288 | 288 | 288 | 288 | 288 | 288 | 288 |
| Fired Cell Density |  |  | 276 |  | 302 | 305 |  |
| Green Wall Thickness ($10^{-3}$ inches) | 14 | 14 | 14 | 14 | 14 | 14 | 14 |
| Fired Wall Thickness ($10^{-3}$ inches) |  |  | 14.2 |  | 13.1 | 13.5 |  |
| Green CFA | 0.419 | 0.419 | 0.419 | 0.419 | 0.419 | 0.419 | 0.419 |
| % Porosity | 50.30 | 51.65 | 57.59 | 61.81 | 61.64 | 60.57 | 56.80 |
| d1 (um) | 2.18 | 4.17 | 5.58 | 2.38 | 3.09 | 2.40 | 2.01 |
| d2 (um) | 6.98 | 6.71 | 6.45 | 3.61 | 4.15 | 3.75 | 2.81 |
| d5 (um) | 8.48 | 8.13 | 7.73 | 5.06 | 5.65 | 5.01 | 3.74 |
| d10 (um) | 9.74 | 9.29 | 9.14 | 6.54 | 7.27 | 6.56 | 4.61 |
| d25 (um) | 11.65 | 11.11 | 11.53 | 10.65 | 10.01 | 10.69 | 7.06 |
| d50 (um) | 13.43 | 12.87 | 13.82 | 16.07 | 12.59 | 15.43 | 10.67 |
| d75 (um) | 15.18 | 14.67 | 15.95 | 20.17 | 14.59 | 18.96 | 13.91 |
| d90 (um) | 22.50 | 21.03 | 23.41 | 34.14 | 19.96 | 26.77 | 21.33 |
| d95 (um) | 47.60 | 48.73 | 59.12 | 89.00 | 42.02 | 51.34 | 50.18 |
| d98 (um) | 111.38 | 141.99 | 158.56 | 208.24 | 122.93 | 132.30 | 151.82 |
| d99 (um) | 163.53 | 209.68 | 209.34 | 263.02 | 189.28 | 199.20 | 216.79 |
| (d50 − d10)/d50 | 0.27 | 0.28 | 0.34 | 0.59 | 0.42 | 0.57 | 0.57 |
| (d90 − d10)/d50 | 0.95 | 0.91 | 1.03 | 1.72 | 1.01 | 1.31 | 1.57 |
| Permeability (mdarcy) | 456 | 423 | 524 | 692 | 445 | 647 | 269 |
| tortuosity factor | 7 | 8.5 | 7.9 | 9.82 | 9.4 | 7.7 | 11.88 |
| $CTE^{25-800°}$ C. $(10^{-7}/K)$ | 5.1 | 8.1 | 10.8 | 3.2 | 6.5 | 0.6 | 1 |
| $CTE^{25-1000°}$ C. $(10^{-7}/K)$ | 9.1 | 12.3 | 14.4 | 6.7 | 9.6 | 4 | 4.3 |
| $CTE^{500-900°}$ C. $(10^{-7}/K)$ | 7.5 | 7.8 | 20.7 | 7 | 16 | 6.8 | 16 |
| MOR (psi) | 264 | 274 | 320 | 249 | 264 | 348 | 399 |
| MOR (MPa) | 1.82 | 1.89 | 2.20 | 1.72 | 1.82 | 2.40 | 2.75 |
| MOR [psi]/(1 − 0.01 × porosity [%]) | 531 | 567 |  | 652 | 688 | 883 | 924 |
| E-mod at 25° C. ($10^5$ psi) | 2.36 | 2.31 | 2.56 |  | 2.77 | 2.79 | 3.65 |
| $Emod^{25° C.}$ (MPa) |  |  |  |  |  |  |  |
| $Emod^{900° C.}$ ($10^5$ psi) heating | 3.99 | 5.46 | 5.15 |  | 5.24 | 5.3 | 6.64 |
| $Emod^{1000° C.}$ ($10^5$ psi) heating | 5.08 | 7.45 | 6.77 |  | 7.06 | 7.09 | 8.82 |
| $Emod^{1000° C.}$ ($10^5$ psi) cooling | 18.3 | 14.4 | 14.7 | 10.5 |  | 11 | 14.5 |
| $Emod^{1000° C.}$ cooling/$Emod^{25° C.}$ | 6.10 | 6.36 | 4.10 |  | 3.97 | 3.94 | 3.95 |

TABLE 11-continued

| | Example No. | | | | | | |
|---|---|---|---|---|---|---|---|
| | PT1 | PT2 | CT1 | CT2 | CT3 | CT4 | CT6 |
| (MOR/Emod) at 25° C. (%) | 0.11 | 0.12 | 0.13 | | 0.10 | 0.12 | 0.11 |

Table 12 shows further examples of 2" diameter ceramic honeycomb articles formed with fibrous raw material via twin screw extruder using the same batch but differing firing temperatures.

TABLE 12

| | Example No. | | |
|---|---|---|---|
| | CT1 | CT1 | CT1 |
| Firing temperature (° C.) | 1405 | 1410 | 1425 |
| Hold time (hours) | 15 | 15 | 15 |
| Green Cell Density | 288 | 288 | 288 |
| Green Wall Thickness ($10^{-3}$ inches) | 14 | 14 | 14 |
| Green CFA | 0.419 | 0.419 | 0.419 |
| % Porosity | 58.76 | 57.59 | 58.21 |
| d1 (um) | 4.01 | 5.58 | 3.17 |
| d2 (um) | 5.10 | 6.45 | 5.99 |
| d5 (um) | 6.79 | 7.73 | 8.34 |
| d10 (um) | 8.37 | 9.14 | 9.96 |
| d25 (um) | 11.04 | 11.53 | 12.41 |
| d50 (um) | 13.69 | 13.82 | 14.70 |
| d75 (um) | 15.83 | 15.95 | 17.15 |
| d90 (um) | 24.05 | 23.41 | 23.30 |
| d95 (um) | 62.84 | 59.12 | 53.04 |
| d98 (um) | 165.25 | 158.56 | 158.53 |
| d99 (um) | 219.58 | 209.34 | 217.93 |
| (d50 − d10)/d50 | 0.39 | 0.34 | 0.32 |
| (d90 − d10)/d50 | 1.15 | 1.03 | 0.91 |
| Polished wall long section porosity (SEM) (%) | | | 55.43 |
| Wall surface porosity (SEM) (%) | | | 30.88 |
| Surface/Bulk porosity (SEM) | | | 0.56 |
| Permeability (mdarcy) | 499 | 524 | 602 |
| tortuosity factor | | | |
| $CTE^{25-800°\ C.}$ ($10^{-7}$/K) | 15.1 | 10.8 | 13.8 |
| $CTE^{25-1000°\ C.}$ ($10^{-7}$/K) | 17.9 | 14.4 | 17.4 |
| $CTE^{500-900°\ C.}$ ($10^{-7}$/K) | 23.8 | 20.65 | 23.6 |
| % AT | | | 72 |
| % Feldspar | | | 23 |
| % Corundum | | | 2.2 |
| % Rutile | | | 0.5 |
| % Mullite | | | 2.6 |
| % Alumina | | | |
| MOR (psi) | 298 | 307 | 259 |
| MOR (MPa) | 2.05 | 2.12 | 1.79 |
| MOR [psi]/(1 − 0.01 × porosity [%]) | 722.60 | 723.89 | 619.77 |
| E-mod at 25° C. ($10^{5\ psi}$) | 0.76 | | 2.56 |
| $Emod^{25°\ C.}$ (MPa) | 538 | | 1765 |
| $Emod^{900°\ C.}$ ($10^5$ psi) heating | 3.27 | | 5.15 |
| $Emod^{1000°\ C.}$ ($10^5$ psi) heating | 4.57 | | 6.77 |
| $Emod^{1000°\ C.}$ cooling/$Emod^{25°\ C.}$ | 6.01 | | 2.64 |
| (MOR/Emod) at 25° C. (%) | 0.392 | | 0.101 |

Table 13 shows further examples of thin wall 2" diameter ceramic honeycomb articles made with fibrous raw material and formed via twin screw extruder. Example CT3 utilized 15% corn starch in the batch, and extrusion was through a twin screw extruder to form a thin wall 2" diameter honeycomb having 400 cells per square inch and 8 mil (0.008 inch) wall thickness webs. CT4 utilized 15% potato starch in the batch, and extrusion was through a twin screw extruder to form a thin wall 2" diameter honeycomb having 400 cells per square inch and 8 mil (0.008 inch) wall thickness webs.

TABLE 13

| | Example No. | |
|---|---|---|
| | CT3 | CT4 |
| type of alumina raw material in batch | Long fiber F1 | Long fiber F1 |
| alumina raw material batch fiber content % (of inorganic oxides) | 48 | 48 |
| excess alumina fiber in batch (%) (compared to particulate alumina batch compo) | | |
| Firing temperature (° C.) | 1410 | 1410 |
| Hold time (hours) | 15 | 15 |
| Green Cell Density | 400 | 400 |
| Green Wall Thickness ($10^{-3}$ inches) | 8.5 | 8.5 |
| % Porosity | 59.00 | 61.30 |
| d1 (um) | 0.31 | 2.53 |
| d2 (um) | 3.82 | 3.40 |
| d5 (um) | 6.68 | 4.69 |
| d10 (um) | 8.30 | 6.14 |
| d25 (um) | 10.57 | 9.97 |
| d50 (um) | 12.67 | 14.69 |
| d75 (um) | 14.88 | 18.64 |
| d90 (um) | 25.17 | 29.57 |
| d95 (um) | 57.57 | 59.80 |
| d98 (um) | 150.30 | 140.19 |
| d99 (um) | 211.37 | 195.31 |
| (d50 − d10)/d50 | 0.34 | 0.58 |
| (d90 − d10)/d50 | 1.33 | 1.59 |
| $CTE^{25-800°\ C.}$ ($10^{-7}$/K) | 9.4 | 0.6 |
| $CTE^{25-1000°\ C.}$ ($10^{-7}$/K) | 11.4 | 2.2 |

As seen from Table 3, embodiments of the batches disclosed herein are capable of yielding high porosity. Even without any pore former in the batch, parts with 46% porosity at a median pore size of 9 micrometers were obtained with alumina fiber in the batch e.g. Example C1. Addition of only 15% corn starch as pore former allowed porosity to reach 60% in the fired ware with an average pore size in the range of 12-15 micrometers, such as Examples C2-C8. Use of 15% potato starch instead of corn starch in the batch yielded a larger average pore size, in the range of 15-17 micrometers at about 55-60% porosity, such as Examples C12, C16, and C18-C20. Addition of 50% potato starch provided high porosity, for example 69%, for Example C15.

Figure 7:
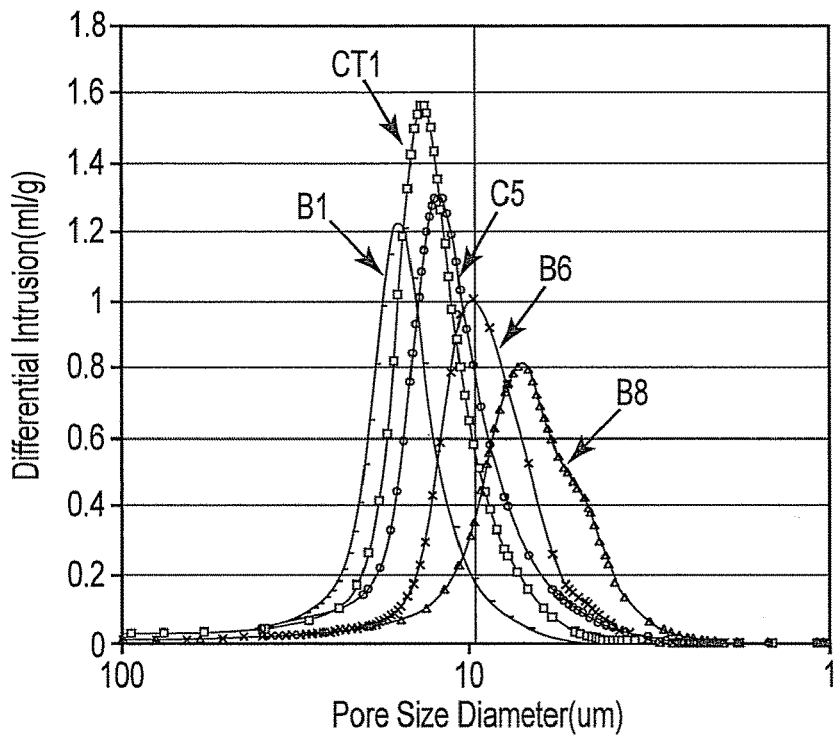
FIG. 7 is a plot of various pore size distributions of various materials disclosed herein.

FIG. 7 is a schematic plot of the pore size distributions of various materials disclosed herein illustrating a broad range of median pore sizes at narrow pore size distribution with the materials disclosed herein. FIG. 7 shows materials as disclosed herein with porosity between 50 and 62% that have all been obtained with 15% pore former (B1—potato starch; B6, C5, CT1, B8—corn starch) and with various levels of fibrous alumina and different sizes of particulate alumina. The plot demonstrates that high porosity materials as disclosed herein having anisotropic microstructure can be provided by selecting from a wide range of median pore size distributions achievable as disclosed herein. For example, anisotropic materials made with potato starch can provide median pore sizes in the range from 12 to 25 micrometers, which can be suitable for diesel particulate filters, and anisotropic materials made with cornstarch and coarse alumina or very low levels of particulate alumina can provide very high porosity materials with pore sizes ranging from 10-15 micrometers, which can be useful in diesel particulate filter applications because of high porosity and pore interconnectivity. Materials as disclosed herein can provide porosity of more than 50% or even more than 60%, and even greater than 65%, and in some embodiments greater than 68%, and such materials can be utilized in applications such as automotive substrates, diesel or gasoline particulate filters and in functionalized filters such as catalyzed filters with integrated partial or full NOx conversion.

Figure 8:
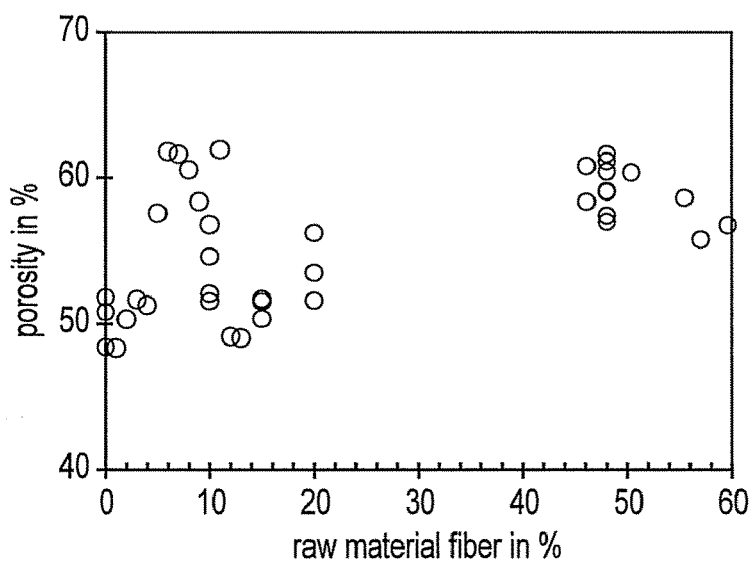
FIG. 8 presents a plot of porosity as a function of concentration of fibrous alumina in the batch together with coarse particulate alumina.

We have found that at similar pore former levels about 5-15% higher porosity (as compared to particulate alumina batch raw material), can be achieved by substituting particulate alumina batch raw material with fibrous alumina raw material given the other batch raw materials (including pore former) remain the same. It was observed that with same amount and type of pore former, batches with suited fibrous alumina and adequate processing reached typically a by 5-15% higher porosity, while preserving the median pore size of comparative materials obtained from batches with large size particulate alumina raw material. FIG. 8 presents a plot of porosity as function of concentration of fibrous alumina in the batch together with coarse particulate alumina, demonstrating a range in porosity obtainable, all using the same amount of pore former (i.e. 15% potato starch or corn starch) In some embodiments, porosity>50% when less than 25% raw material fiber was used in the batch. In other embodiments, porosity>55%, and even>60%, when greater than 45% raw material fiber was used in the batch.

In general, the materials disclosed herein exhibited narrow pore size distributions. In particular, the contribution of very large and very small pores was significantly lowered in the anisotropic materials disclosed herein. Preferably, the d-factor (df=(d50−d10)/d50) is less than 0.5, more preferably less than 0.4, and even more preferably less than 0.3. The d-factor can be a useful indicator for applicability of a material for use of catalyst in a filter; the lower the value the generally more suited is a substrate for hosting a catalyst and using it efficiently. Other indicators on the suitability of the pore structure are pore network characteristics, such as the width of the pore size distribution (d90−d10)/d50 or the permeability, which both provide indication on the back pressure of the uncoated substrate. Low pressure drop is enhanced by high porosity and a narrow pore size distribution and large pore size; filtration efficiency is enhanced by a narrow pore size distribution with small pore size.

In general, the materials disclosed herein exhibited high wall permeability, and as compared to the corresponding products obtained with particulate raw materials, they showed higher permeability at a smaller average pore size and narrower pore size distribution, useful for combining the advantages of low pressure drop and high filtration efficiency.

We note that a ceramic article was formed from pressing batch A16 instead of extruding.

The materials disclosed herein preferably contain phases, and more preferably a primary phase of aluminum titanate, having very low thermal expansion. Aluminum titanate crystals show anisotropy in their thermal expansion. Both crystal structures show expansion of their a- and b-axis under heating and contraction of their c-axis. A broad range of response in thermal expansion for the embodiments of the anisotropic AT-based materials disclosed herein was demonstrated, ranging from a completely negative average coefficient of thermal expansion from room temperature to 800° C. to positive average coefficient. Some materials have in the range from room temperature to 800° C. a very small, almost zero, average coefficient of thermal expansion; for example, the material of Example B1 has a coefficient of 0.2 10-7 $K^{-1}$ and C2 has a coefficient of −1.1 10-7 $K^{-1}$ in this temperature range in its axial direction. Some materials (such as Examples C9, C10) have negative coefficient of −6 10-7 $K^{-1}$ in this temperature range in their axial direction Not only the average coefficients differ, but also the shape of the heating and cooling curves. In addition, differences in the slope of the expansion curves are observed. Some very flat curves can provide very low thermal expansion for high temperature range applications. In conclusion, anisotropic AT-based materials disclosed herein can provide a variety of thermal expansion behaviors, absolute values and temperature dependencies, as achieved by using different amounts of fibrous alumina, different sizes of the particulate alumina and different types of pore formers.

Figure 9:
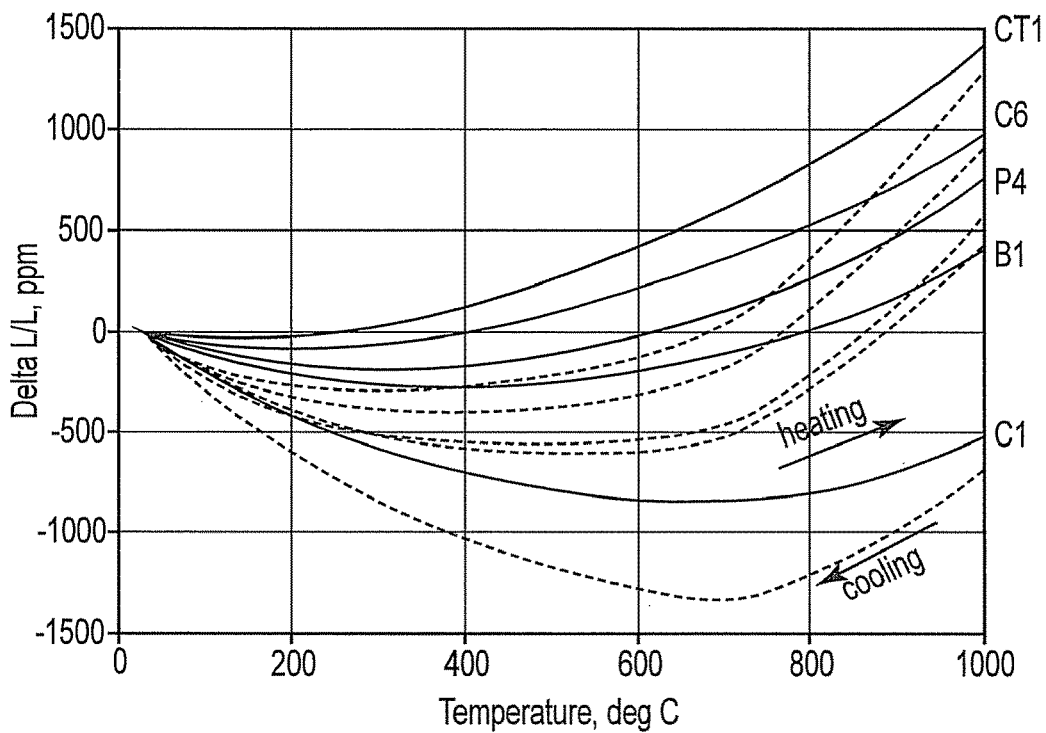
FIG. 9 is a plot comparing the thermal expansion and contraction during heating and cooling cycle for different materials disclosed herein.

FIG. 9 is a plot that compares the thermal expansion and contraction during heating and cooling cycle for different materials disclosed herein and shows the wide range of thermal expansion behavior that can be met by these materials. The solid lines represent expansion upon heating, and the dashed lines represent contraction upon cooling. In FIG. 9, the respective cooling curve (dashed line) corresponding to a given heating curve can be identified at or below the corresponding heating curve (solid line) at 1000 C.

Anisotropic microstructures result in an improvement in strength. Comparison of the MOR of honeycomb in (300/14) geometry, and porosity to current art materials and a control specimen that does not have anisotropic microstructure (P2), shows improvement in MOR. Compared to materials made with particulate alumina, materials made from fibrous alumina as raw material exhibit high strength even with very high porosity.

Figure 10:
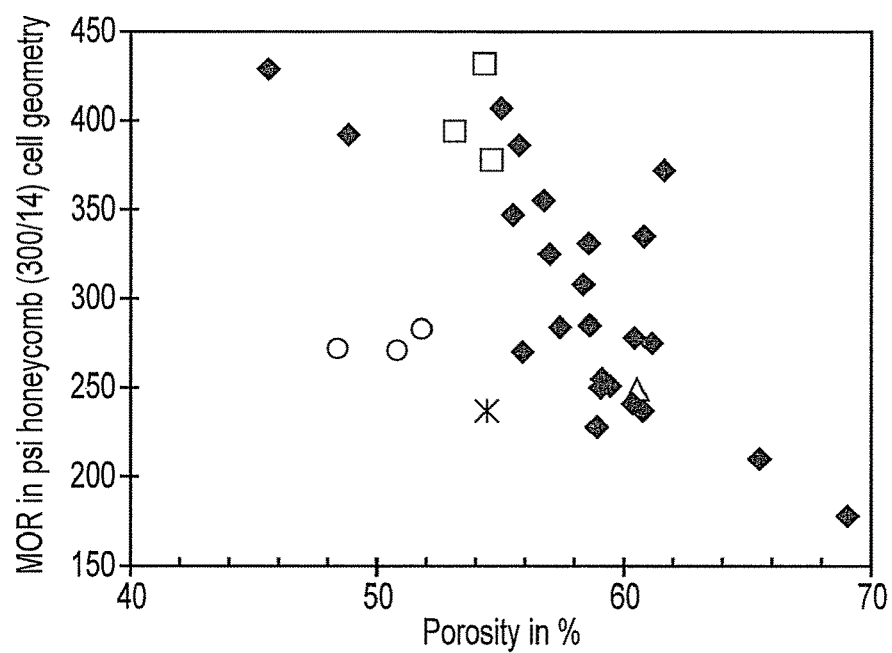
FIG. 10 is a plot of MOR as a function of porosity of various of the disclosed honeycomb bodies made using various types of batch alumina (particulate or fibrous) extruded with 300 cells per square inch and 14 mil wall thickness, and fired.

FIG. 10 is a plot of MOR of various honeycombs as function of porosity. The materials were made from various types of batch alumina (particulate or fibrous), extruded into honeycomb bodies of 300 cells per square inch and 14 mil (0.014 inch) thick walls, and fired. The honeycomb bodies were made from batches with all particulate alumina (○), F1 alumina fiber (♦), F2 alumina fiber (□), F3 alumina fiber (X), or F3 alumina fiber (△). In some embodiments of the anisotropic materials disclosed herein, the MOR is greater than 350 psi, in other embodiments larger than 380 psi and in other embodiments even larger than 400 psi for a (300/14) honeycomb geometry. In some embodiments, particulate filters such as diesel particulate filters can be made of anisotropic AT-based materials, which provide low pressure drop due to their high porosity of possibly 60% and a high filtration efficiency due to smaller pore size but which would still meet the requested low backpressure.

Without being held to any particular theory, the thermal expansion of an aluminum titanate ceramic is affected by the mixture of the phases and their crystallographic orientation, but also can be lowered by microcracking. In general, the higher the microcrack density, the lower is the CTE. The density of the microcracks in a ceramic correlates with the local misorientation between the grains in the microstructure and the local strain build up during cooling. The extreme case that can be considered for a monolithic AT ceramic is a microstructure with grains with very little misorientation that almost behave like a single crystal and does not microcrack and a microstructure with grains with large c—a,b misorientation (c—being the crystallographic axis of aluminum titanate that shows negative coefficient of thermal expansion and a, b showing positive expansion) that would build up high stresses during cooling and induce severe microcracking. In multiphase ceramics as the aluminum-feldspar composites, stresses during cooling are not only caused by the anisotropy of the expansion of the aluminum titanate phase; secondary phases with their higher coefficient of thermal expansion contribute to the build up of local strain and affect further microcracking of the aluminum titanate grains.

Therefore, aluminum titanate grain size, texture and distribution of primary and secondary phases directly affect the microcrack density in the material and the material's CTE and strength.

The materials disclosed herein exhibit differences in microstructure and AT texture compared to known aluminum titanate based materials.

For example: in aluminum titanate-feldspar composite obtained from coarse particulate alumina raw material with an average particulate size of 10 micrometers the aluminum titanate average grain size ranges from 10-15 micrometers; in aluminum titanate-feldspar composite obtained from ⅔ of particulate alumina raw material with an average particulate size of 10 micrometers and ⅓ of fibrous alumina raw material, the aluminum titanate average grain size ranges from 5-10 micrometers; in aluminum titanate-feldspar composite obtained from fibrous alumina raw material with an average fiber diameter of 3-20 micrometers and 3 mm in length, the aluminum titanate average grain size is smaller than 5 micrometers.

Materials disclosed herein that have been made by simple compaction under force show preferential alignment of the raw material alumina fibers in the pressing plane and, in the corresponding fired ware, show a preferential alignment of the c-direction of the primary reaction product aluminum titanate also in this plane.

Figure 11:
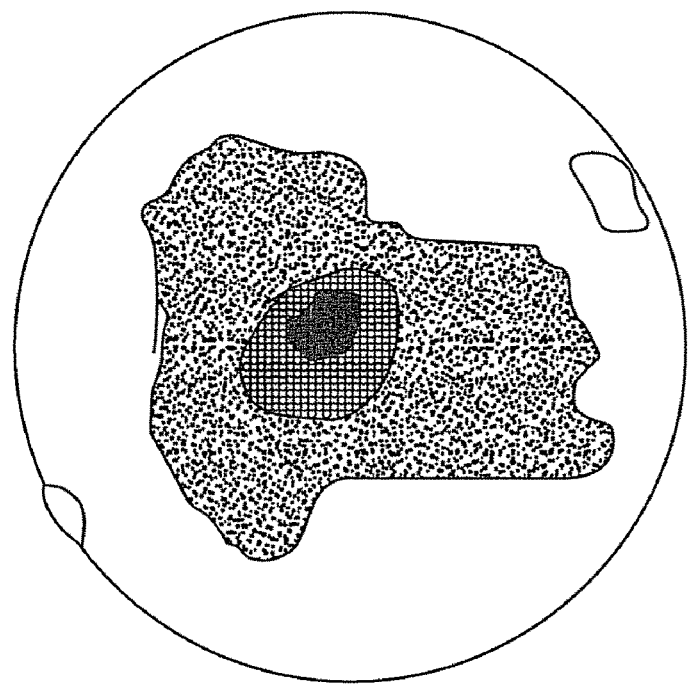
FIG. 11 is a pole figure for the negative expansion c-axis of aluminum titanate for material obtained from fibrous alumina raw material.
Figure 12:
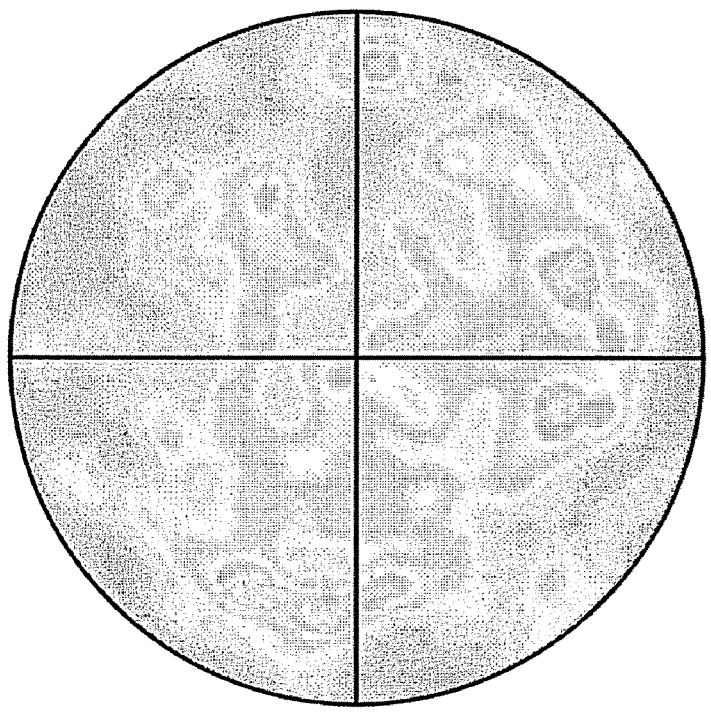
FIG. 12 is a pole figure for the negative expansion c-axis of aluminum titanate for material obtained from coarse particulate alumina raw material.

Extruded parts with fibrous alumina show a strong preferential overall alignment of the negative expansion c-direction in the axial direction of the honeycomb. FIG. 11 shows an alumina titanate pole figure for the negative expansion c-axis for material obtained with fibrous alumina raw material. The high intensity in the center of the pole figure for the material obtained from fiber on the honeycomb cross section indicates a strong preferential orientation of the aluminum titanate crystal c-axis in the honeycomb channel direction. In FIG. 11, the black shading indicates a preferential alignment factor of 3-4. FIG. 12 shows an alumina titanate pole figure for the negative expansion c-axis for material obtained from coarse particulate alumina raw materials, shown for the c-axis of aluminum titanate within space a random distribution, wherein the pole figure is taken in the direction of the aluminum titanate c-axis, which shows essentially no such preferential crystallographic orientation is observed.

The corresponding X-ray spectra show differences in the relative intensity in the axial direction from peaks with significant contribution from the aluminum titanate c-axis.

We have found that aluminum-titanate based ceramics obtained from at least one fibrous raw material exhibit a lower elastic modulus at higher temperatures as compared to aluminum-titanate based ceramics obtained from particulate (only) inorganic ceramic-forming raw materials. The elastic modulus (EMOD) of ceramics obtained from particulates only typically exhibit a strong hysteresis during heating and cooling of the ceramic. The hysteresis for materials obtained with similar batches but with fibrous alumina as raw materials exhibit less hysteresis in the heating-cooling cycle. While the EMOD for a comparative ceramic obtained with particulate coarse alumina and a material obtained from fibrous raw materials was very similar at room temperature i.e. at about 300000 psi, the ratio of EMOD@1000 C/EMOD@25 C on cooling was larger than 6 for materials obtained from particulate alumina, while the same ratio was less than about 4 for materials derived from fibrous raw material. Thus, we have found examples where the materials disclosed herein obtained with fibrous alumina raw material show similar room temperature values as particulate derived materials, and show hysteresis in a heating-cooling cycle, however, the disclosed materials obtained with fibrous raw materials exhibit lower elastic modulus at high temperatures. The improvement in high temperature E-mod can result in an improvement in strain tolerance at high temperature and thus better thermal shock resistance at high temperature, as the combination of improved high temperature MOR, lower high temperature elastic modulus and smaller CTE all contribute to very high thermal shock resistance.

Various embodiments of the porous ceramic body of the present disclosure exhibit high strength and low CTE such as illustrated by the above examples.

Some embodiments of the porous ceramic body of the present disclosure comprise an MOR of greater than 300 psi and a CTE from 20 to 1000° C. (in $10^{-7}$ $K^{-1}$) of less than 15, and in some of these embodiments less than 10, and in other of these embodiments less than 5, and in other of these embodiments less than or equal to 5 and greater than or equal to −5. In other embodiments, the porous ceramic body comprises an MOR (in psi) of greater than 350 and a CTE from 20 to 1000° C. (in $10^{-7}$ $K^{-1}$) of less than 15, and in some of these embodiments less than 10, and in other of these embodiments less than 5, and in other of these embodiments less than or equal to 5 and greater than or equal to −5.

Some embodiments of the porous ceramic body of the present disclosure comprise a specific MOR, defined as "specific MOR"=MOR/(1−0.01×porosity), where MOR is in psi and porosity is in %, of greater than 600 psi for a 300/14 honeycomb geometry (i.e. 300 cells per square inch and web wall thickness of 14 mils or 0.014 inch) and a CTE from 20° C. to 1000° C. of less than 15×$10^{-7}$ $K^{-1}$, and in some of these embodiments less than 10×$10^{-7}$ $K^{-1}$, and in other of these embodiments less than 5×$10^{-7}$ $K^{-1}$, and in other of these embodiments less than or equal to 5×$10^{-7}$ $K^{-1}$ and greater than or equal to −5×$10^{-7}$ $K^{-1}$. In other embodiments, the porous ceramic body of the present disclosure comprises a specific MOR (=MOR/(1−0.01×porosity)), where MOR is in psi and porosity is in %, of greater than 700 psi and a CTE from 20 to 1000° C. of less than 15×$10^{-7}$ $K^{-1}$, and in some of these embodiments less than 10×$10^{-7}$ $K^{-1}$, and in other of these embodiments less than 5×$10^{-7}$ $K^{-1}$, and in other of these embodiments less than or equal to 5×$10^{-7}$ $K^{-1}$ and greater than or equal to −5×$10^{-7}$ $K^{-1}$. In other embodiments the porous ceramic body of the present disclosure comprises a specific MOR (=MOR/(1−0.01×porosity)), where MOR is in psi and porosity is in %, of greater than 800 psi and a CTE from 20 to 1000° C. of less than 15×$10^{-7}$ $K^{-1}$, and in some of these embodiments less than 10×$10^{-7}$ $K^{-1}$, and in other of these embodiments less than 5×$10^{-7}$ $K^{-1}$, and in other of these embodiments less than or equal to 5×$10^{-7}$ $K^{-1}$ and greater than or equal to $-5 \times 10^{-7}$ K$^{-1}$. In other embodiments the porous ceramic body of the present disclosure comprises a specific MOR (=MOR/(1-0.01×porosity)), where MOR is in psi and porosity is in %, of greater than 900 psi and a CTE from 20 to 1000° C. of less than $15 \times 10^{-7}$ K$^{-1}$, and in some of these embodiments less than $10 \times 10^{-7}$ K$^{-1}$.

Some embodiments of the porous ceramic body of the present disclosure comprise an MOR of greater than 300 psi for 300/14 honeycomb geometry and a CTE from 20 to 800° C. of less than $15 \times 10^{-7}$ K$^{-1}$, and in some of these embodiments less than $10 \times 10^{-7}$ K$^{-1}$, and in other of these embodiments less than $5 \times 10^{-7}$ K$^{-1}$, and in other of these embodiments less than or equal to $5 \times 10^{-7}$ K$^{-1}$ and greater than or equal to $-5 \times 10^{-7}$ K$^{-1}$. In other embodiments, the porous ceramic body comprises an MOR (in psi) of greater than 350 and a CTE from 20 to 1000° C. of less than $15 \times 10^{-7}$ K$^{-1}$, and in some of these embodiments less than $10 \times 10^{-7}$ K$^{-1}$, and in other of these embodiments less than $5\ 10^{-7}$ K$^{-1}$, and in other of these embodiments less than or equal to $5 \times 10^{-7}$ K$^{-1}$ and greater than or equal to $-5 \times 10^{-7}$ K$^{-1}$.

Some embodiments of the porous ceramic body of the present disclosure comprise a porosity of greater than 54% and an MOR for 300/14 honeycomb geometry of greater than 150 psi, some greater than 200 psi, some greater than 300 psi, and some even greater than 350 psi. Some embodiments of the porous ceramic body of the present disclosure comprise a porosity of greater than 60% and an MOR of greater than 150 psi, some greater than 200 psi, some greater than 300 psi, and some even greater than 350 psi. Some embodiments of the porous ceramic body of the present disclosure comprise a porosity of greater than 64% and an MOR of greater than 150 psi, some greater than 200 psi. Some embodiments disclosure comprise a porosity of greater than 68% and an MOR of greater than 150 psi.

In some embodiments of the present disclosure, a porous ceramic body is provided from batch comprised of greater than 10% precursor fibers by weight of inorganic raw materials in the batch, the body having an MOR of greater than 300 psi, and in some of these embodiments greater than 350 psi for 300/14honeycomb cell geometry or equivalent.

In some embodiments of the present disclosure, a porous ceramic body is provided from batch comprised of greater than 30% precursor fibers by weight of inorganic raw materials in the batch, the body having an MOR of greater than 250 psi, and in some of these embodiments greater than 300 psi for 300/14 honeycomb cell geometry or equivalent.

In some embodiments of the present disclosure, a porous ceramic body is provided from batch comprised of greater than 40% precursor fibers by weight of inorganic raw materials in the batch, the body having an MOR of greater than 250 psi, and in some of these embodiments greater than 300 psi, and in some of these embodiments greater than 350 psi and in some even higher than 400 psi for 300/14 honeycomb cell geometry or equivalent.

In some embodiments of the present disclosure, a porous ceramic body is provided from batch comprised of greater than 50% precursor fibers by weight of inorganic raw materials in the batch, the body having an MOR of greater than 300 psi, and in some of these embodiments greater than 350 psi for 300/14 honeycomb cell geometry or equivalent.

In some embodiments of the present disclosure, a porous ceramic body is provided from batch comprised of greater than 5% precursor fibers by weight of inorganic raw materials in the batch, the body having a specific MOR (in psi) defined as specific MOR=MOR/(1-porosity(in %)) is greater than 600 psi. In some embodiments, a porous ceramic body is made from batch comprised of greater than 10% precursor fibers by weight of inorganic raw materials in the batch, such that the specific MOR is greater than 700 psi, and in some of these embodiments greater than 800 psi.

In some embodiments of the present disclosure, a porous ceramic body is provided from batch comprised of greater than 40% precursor fibers by weight of inorganic raw materials in the batch, the body having a specific MOR (in psi) such that the specific MOR is greater than 400 psi, and in some of these embodiments, greater than 500 psi, greater than 600 psi, greater than 700 psi, greater than 800 psi, and even greater than 900 psi. In some embodiments of the present disclosure, a porous ceramic body is provided from batch comprised of greater than 50% precursor fibers by weight of inorganic raw materials in the batch, such that the specific MOR is greater than 400 psi, and in some of these embodiments, greater than 500 psi, greater than 600 psi, greater than 700 psi, and even greater than 800 psi. In some embodiments of the present disclosure, a porous ceramic body is provided from batch comprised of greater than 55% precursor fibers by weight of inorganic raw materials in the batch, such that the specific MOR is greater than 400 psi, and in some of these embodiments, greater than 500 psi, greater than 600 psi, greater than 700 psi, and even greater than 800 psi.

In some embodiments of the present disclosure, the porous ceramic body exhibits a value of (d50–d10)/d50 of less than 1.00, and in some of these embodiments, less than 0.90, and in others less than 0.70. In some embodiments, (d50-d10)/d50 is greater than 0.25 and less than 0.90. In other embodiments, (d50–d10)/d50 is less than 0.6. In still other embodiments, (d50–d10)/d50 is less than 0.35.

In some embodiments of the present disclosure, the porous ceramic body exhibits a value of (d90–d10)/d50 of less than 5.0, and in some of these embodiments, less than 3.0, and in others less than 2.0. In some embodiments, (d90–d10)/d50 is greater than 0.5 and less than 3.00.

In some embodiments of the present disclosure, the porous ceramic body exhibits a tortuosity of less than 20, and in some of these embodiments, less than 15. In other embodiments, the porous ceramic body exhibits a tortuosity of less than 20, and in some of these embodiments, less than 15. In other embodiments, the porous ceramic body exhibits a tortuosity of greater than 2, and in some of these embodiments, greater than 5. In some embodiments, the tortuosity is greater than 5 and less than 15.

Table 14 shows crystalline phases and glass in fired compositions.

TABLE 14

| | Example No. | | | | | | | | |
|---|---|---|---|---|---|---|---|---|---|
| | P2 | CT1 | PT1 | PT2 | B5 | B4 | CT3 | CT4 | C17 |
| % aluminum titanate | 73 | 72 | 73.2 | 72.1 | 72.8 | 72.8 | 72.8 | 71.4 | 61.4 |
| % Feldspar | 21 | 23 | 20.6 | 21.3 | 20.6 | 20.6 | 21.4 | 21.4 | 17.8 |
| % Rutile | 0.2 | 0.5 | 0.7 | 0.7 | 0.9 | 0.7 | 1.7 | 2 | 0.6 |
| % Mullite | | 2.6 | | | | | | | |

TABLE 14-continued

| | P2 | CT1 | PT1 | PT2 | B5 | B4 | CT3 | CT4 | C17 |
|---|---|---|---|---|---|---|---|---|---|
| % Alumina | 5.4 | 2.2 | 5.6 | 5.9 | 5.7 | 6 | 4.1 | 5.5 | 20.2 |
| glass | yes | yes | yes | yes | yes | Yes | yes | yes | yes |

Table 15 lists various examples of ceramic compositions having microstructure anisotropy. Examples C4 and P2 were extruded via ram, while the remaining examples in Table 15 were extruded via twin screw.

TABLE 15

| | CT1 | C4 | CT3 | CT4 | P4 | P2 | PT1 |
|---|---|---|---|---|---|---|---|
| POROSITY | | | | | | | |
| d50pore-long-extrdir in μm | 29.1 | 25.7 | 26.8 | 26.4 | 26.4 | 21.6 | 24.7 |
| d50pore-long-perpextrdir in μm | 22.5 | 16.3 | 18.42 | 19.6 | 23.8 | 19.7 | 21.9 |
| Af-pore-long | 1.29 | 1.58 | 1.45 | 1.34 | 1.11 | 1.10 | 1.13 |
| d50pore-cross-dir1 in μm | 18.7 | 16.6 | 19.4 | 19.0 | 20.5 | 17.4 | 22.3 |
| d50pore-cross-dir2 in μm | 19.7 | 18.5 | 22.8 | 22.2 | 23.5 | 19.7 | 25.0 |
| Af-pore-cross | 0.95 | 0.90 | 0.85 | 0.86 | 0.86 | 0.88 | 0.89 |
| MATTER | | | | | | | |
| d50matter-long-extrdir in μm | 20.6 | 17.6 | | | | 26.2 | |
| d50matter-cross-perpextrdir in μm | 15.7 | 11.0 | | | | 23.9 | |
| Af-matter-long | 1.31 | 1.60 | | | | 1.10 | |
| d50matter-cross-dir1 in μm | 16.2 | 9.5 | | | | 22.0 | |
| d50matter-cross-dir2 in μm | 18.4 | 8.5 | | | | 20.1 | |
| Af-matter-cross | 0.88 | 1.12 | | | | 1.09 | |

In some embodiments of the ceramic disclosed herein, a porous ceramic body comprised of a polycrystalline ceramic comprising an anisotropic microstructure is characterized by an anisotropy factor, Af-pore-long, wherein 1.2<Af-pore-long<5; in some embodiments, 1.25<Af-pore-long<3.

In some embodiments of the ceramic disclosed herein, a porous ceramic body comprised of a polycrystalline ceramic comprising an anisotropic microstructure is characterized by an anisotropy factor, Af-matter-long, wherein 1.2<Af-matter-long<5; in some embodiments, 1.25<Af-matter-long<3.

In some embodiments of the ceramic disclosed herein, a porous ceramic body comprised of a polycrystalline ceramic comprising an anisotropic microstructure is characterized by a first anisotropy factor, Af-pore-long, a second anisotropy factor, Af-pore-cross, a third anisotropy factor, Af-matter-long, and a fourth anisotropy factor, Af-matter-cross, wherein 5>Af-pore-long>1.2 and 5>Af-matter-long>1.2.

In some embodiments of the ceramic disclosed herein, a porous ceramic body comprised of a polycrystalline ceramic comprising an anisotropic microstructure is characterized by a first anisotropy factor, Af-pore-long, a second anisotropy factor, Af-pore-cross, a third anisotropy factor, Af-matter-long, and a fourth anisotropy factor, Af-matter-cross, wherein 3>Af-pore-long>1.25 and 3>Af-matter-long>1.3.

In one set of embodiments of the ceramic disclosed herein, Af-pore-long>1.25 and Af-matter-long>1.3. In another set of embodiments the ceramic is characterized by an anisotropy of its spatial porosity distribution with 1.25<Af-pore-long<3 with 0.9<Af-pore-cross<1.1 and an anisotropy of its spatial matter distribution with 1.2<Af-matter-long<3 with 0.85<Af-matter-cross<1.15.

Porous aluminum titanate-based honeycomb ceramic articles can be made with materials disclosed herein that combine low thermal expansion, high porosity, low Young modulus and high strength, and are attractive for catalyst substrate (e.g. automotive catalytic converter) and filter (e.g. particulate filter or diesel particulate filter) applications.

During the processing of shaped aluminum titanate composite products, raw materials such as alumina, titania and raw materials for forming the second phase, for example such as strontium oxide, silica to form feldspar can be mixed with organic binders pore formers and water to form a plasticized or plastic mixture.

The plastic mixture is extruded or otherwise shaped into the desired form, known in the industry as a "green body." Shaping can be achieved by extruding the mixed raw materials through a die. The green body can then be dried and then fired (e.g. to temperatures of about 1350° C. to about 1450° C., depending on the raw material combination). During the drying and firing process, the raw materials react, and may pass through various intermediates, into the final crystalline alumina titanate composite. The shaped green part transforms upon sintering into a solid, durable ceramic article. In some embodiments, the primary solid phase of the ceramic exhibits strong crystallographic texture of an aluminum titanate phase with a strong preferential alignment of the crystallographic c-axis of aluminum titanate in the extrusion direction (or perpendicular to the pressing direction when only pressed)

Filters, such as diesel particulate filters (DPF), can be obtained from a honeycomb porous ceramic by plugging channels (e.g. neighboring channels in a checkerboard pattern, such as on both ends) to form a filter with inlet and outlet channels. The exhaust gas has then to flow through the wall of the honeycomb. During its path through the porous honeycomb wall, small particulates from the exhaust gas are deposited on the pore surface, thus providing filtering of the exhaust gas. The forming soot cake is periodically burned in a regeneration cycle, e.g. so that a DPF has a lifetime similar to that of the vehicle.

Particulate filters, such as diesel particulate filters (DPF), can be made from the compositions disclosed herein to have high porosity and strength, and such filters can also be functionalized, allowing additional exhaust after-treatment functions such as partial or complete NOx elimination.

In one aspect disclosed herein, a porous ceramic body is comprised of a polycrystalline ceramic comprising an anisotropic microstructure characterized by an anisotropy factor, Af-pore-long, wherein 1.2<Af-pore-long<5. In some embodiments, 1.25<Af-pore-long<3.

In another aspect disclosed herein, a porous ceramic body is comprised of a polycrystalline ceramic comprising an anisotropic microstructure characterized by an anisotropy factor, Af-matter-long, wherein 1.2<Af-matter-long<5. In some embodiments, 1.25<Af-matter-long<3.

In another aspect disclosed herein, a porous ceramic body is comprised of a polycrystalline ceramic comprising an anisotropic microstructure characterized by a first anisotropy factor, Af-pore-long, a second anisotropy factor, Af-pore-cross, a third anisotropy factor, Af-matter-long, and a fourth anisotropy factor, Af-matter-cross, wherein 5>Af-pore-long>1.2 and 5>Af-matter-long>1.2.

In another aspect disclosed herein, a porous ceramic body is comprised of a polycrystalline ceramic comprising an anisotropic microstructure characterized by a first anisotropy factor, Af-pore-long, a second anisotropy factor, Af-pore-cross, a third anisotropy factor, Af-matter-long, and a fourth anisotropy factor, Af-matter-cross, wherein 3>Af-pore-long>1.25 and 3>Af-matter-long>1.3.

In another aspect disclosed herein, a porous ceramic body is comprised of a polycrystalline ceramic comprising an anisotropic microstructure characterized by a first anisotropy factor, Af-pore-long, a second anisotropy factor, Af-pore-cross, a third anisotropy factor, Af-matter-long, and a fourth anisotropy factor, Af-matter-cross, wherein 1.25<Af-pore-long<3 and 0.9<Af-pore-cross<1.1.

In another aspect disclosed herein, a porous ceramic body is comprised of a polycrystalline ceramic comprising an anisotropic microstructure characterized by a first anisotropy factor, Af-pore-long, a second anisotropy factor, Af-pore-cross, a third anisotropy factor, Af-matter-long, and a fourth anisotropy factor, Af-matter-cross, wherein 1.2<Af-matter-long<3 and 0.85<Af-matter-cross<1.15.

In another aspect disclosed herein, a porous ceramic body is comprised of a polycrystalline ceramic comprising an anisotropic microstructure characterized by a first anisotropy factor, Af-pore-long, a second anisotropy factor, Af-pore-cross, a third anisotropy factor, Af-matter-long, and a fourth anisotropy factor, Af-matter-cross, wherein 1.25<Af-pore-long<3 and 0.9<Af-pore-cross<1.1, and 1.2<Af-matter-long<3 and 0.85<Af-matter-cross<1.15.

In another aspect disclosed herein, a porous ceramic body is comprised of a polycrystalline ceramic comprising an anisotropic microstructure, the anisotropic microstructure being comprised of aligned multiphase polycrystalline reticular formations. In some embodiments, the reticular formations are comprised of a primary solid phase and at least minor solid phase. In some embodiments, the microstructure further comprises non-aligned formations. In some embodiments, the microstructure contains microcracks. In some embodiments, the microstructure has an anisotropy factor 5>Af-pore-long>1.2. In some embodiments, the microstructure has an anisotropy factor 3>Af-pore-long>1.2. In some embodiments, the microstructure has an anisotropy factor 5>Af-matter-long>1.2. In some embodiments, the microstructure has an anisotropy factor 3>Af-matter-long>1.2. In some embodiments, the microstructure has anisotropy factors Af-pore-long and Af-matter-long, and 5>Af-pore-long>1.25 and 5>Af-matter-long>1.3. In some embodiments, the microstructure has anisotropy factors Af-pore-long and Af-matter-long, and 3>Af-pore-long>1.25 and 3>Af-matter-long>1.3. In some embodiments, the microstructure has anisotropy factors Af-pore-long and Af-pore-cross, and 1.25<Af-pore-long<3 and 0.9<Af-pore-cross<1.1. In some embodiments, the microstructure has anisotropy factors Af-matter-long and Af-matter-cross, and 1.2<Af-matter-long<3 and 0.85<Af-matter-cross<1.15. In some embodiments, the microstructure has anisotropy factors Af-pore-long, Af-pore-cross, Af-matter-long, and Af-matter-cross, and 1.25<Af-pore-long<3 and 0.9<Af-pore-cross<1.1, and 1.2<Af-matter-long<3 and 0.85<Af-matter-cross<1.15.

In some embodiments of this aspect of the present disclosure, the reticular formations are polycrystalline. In some embodiments, the crystals have a maximum dimension of between 0.5 and 100 micrometers. In some embodiments, a majority of the primary phase crystals have a maximum dimension of between 1 and 50 micrometers. In some embodiments, a majority of the primary phase crystals have a maximum dimension of between 1 and 10 micrometers. In some embodiments, the reticular formations constitute greater than 5% by weight of the body. In some embodiments, the reticular formations constitutes between 5% and 60% by weight of the body. In some embodiments, the reticular formations constitute more than 60% by weight of the body.

In some embodiments of this aspect, the reticular formations are comprised of a primary solid phase and at least one minor solid phase. The primary solid phase is aluminum titanate. In some embodiments, the minor solid phase is selected from the group consisting of feldspar, mullite, cordierite, spinel, strontium titanate, and combinations thereof. In some embodiments, the minor solid phase is selected from the group consisting of oxides of aluminum, titanium, silicon, magnesium, alkaline earth metals, rare earth metals, alkali metals, transition metals, or combinations thereof. In some embodiments, the first minor phase is selected from the group consisting of feldspar, mullite, spinel, strontium titanate, and combinations thereof. In some embodiments, the second minor phase is selected from the group consisting of oxides of aluminum, titanium, silicon, magnesium, alkaline earth metals, rare earth metals, alkali metals, transition metals, or combinations thereof. In some embodiments, exterior regions of at least some of the reticular formations are comprised of a primary solid phase and an interior region of the reticular formations are comprised of a minor solid phase. In some embodiments, the minor solid phase is comprised of a ceramic-forming precursor. In some embodiments, the minor solid phase is selected from the group consisting of oxides of aluminum, titanium, silicon, magnesium, alkaline earth metals, rare earth metals, alkali metals, transition metals, or combinations thereof.

In preferred embodiments of this aspect, the reticular formations are comprised of a primary solid phase of aluminum titanate. In some embodiments, the microstructure further comprises multiphase polycrystalline clump formations.

In some embodiments of this aspect, the porous body has a porosity of greater than 40%, or greater than 50%, or greater than 55%, or greater than 60%, or even greater than 65%.

In some embodiments of this aspect, the porous body comprises pores having a median pore size of greater than 10 micrometers. In some embodiments, the porous body comprises pores having a median pore size of larger than 5 micrometers. In some embodiments, the porous body comprises pores having a median pore size of less than 10 micrometers. In some embodiments, the porous body comprises pores having a median pore size of less than 20 micrometers. In some embodiments, the porous body comprises pores having a median pore size of greater than 10 and less than 20 micrometers.

In some embodiments of this aspect, the porous body has an average CTE having a magnitude less than $25 \times 10^{-7} K^{-1}$ in the temperature range from 20° C. to 1000° C. In some embodiments, the porous body in an axial direction has an average CTE having a magnitude less than $5 \times 10^{-7} K^{-1}$ for all temperatures in the temperature range from 20° C. to 1000° C. In some embodiments, the body in an axial direction has a negative average coefficient of thermal expansion in the temperature range from 20° C. to 1000° C. In some embodiments, the porous body has in an axial direction an elastic modulus of less than 1,400,000 psi for all temperatures from 20° C. to 1200° C. In some embodiments, the porous body has in an axial direction an elastic modulus of less than 300,000 psi at 20° C. In some embodiments, the porous body exhibits a ratio of $EMOD_{1000C}/EMOD_{20C}<5$ in an axial direction, a radial direction, or both. In some embodiments, the porous body has a wall strength greater than 3 MPa. In some embodiments, the porous body has a wall strength greater than 5 MPa. In some embodiments, the porous body has a wall strength greater than 8 MPa. In some embodiments, the porous honeycomb has an MOR greater than 300 psi in (300/14) cell geometry, or greater than 350 psi, or even greater than 400 psi.

In some embodiments of this aspect, the porous body is in the form of a honeycomb structure. In some embodiments, the porous body is a wall flow filter or a flow through substrate. In some of these embodiments, the porous body is comprised of aluminum titanate.

In some embodiments of this aspect, the porous body has a strain tolerance of greater than 0.10%. In some embodiments, the porous body exhibits a thermal shock parameter TSP of at least about 1250° C. In some embodiments, the porous body has a permeability of at least 500 mDarcy.

In another aspect of the present disclosure, an inorganic composition is comprised of an anisotropic microstructure comprising the reaction product of a plurality of ceramic-forming precursors, wherein the reaction product is present as polycrystalline multiphase reticular formations.

In another aspect of the present disclosure, a method is provided for forming a porous body comprised of a first ceramic phase of aluminum titanate, the method comprising: forming a plasticized mixture comprising a plurality of inorganic ceramic-forming precursors including a first precursor, wherein at least part of the first precursor is present in the mixture in the form of precursor fibers; shaping the plasticized mixture into a green body; and heating the green body sufficient to cause the precursors to react together to produce the first ceramic phase.

In some embodiments of this aspect, the polycrystalline reticular formations are polycrystalline multiphase reticular formations. In some embodiments, at least some of the first precursor is present in the mixture in the form of non-fibrous particles. In some embodiments, the plurality of inorganic ceramic-forming precursors further comprises a second precursor, wherein at least part of the second precursor is present in the mixture in the form of second precursor fibers, wherein the second precursor is different from the first precursor. In some of these embodiments, the first precursor is alumina and the second precursor is silica.

In some embodiments of this aspect, the plurality of inorganic ceramic-forming precursors further comprises a second precursor, wherein at least some of the precursor fibers contain both the first precursor and the second precursor. In some embodiments, the mixture further comprises a ceramic material. In some embodiments, the ceramic material is comprised of the first ceramic phase material.

In some embodiments of this aspect, a reactive portion of the precursor fibers reacts during the heating to form the first ceramic phase material, and wherein an excess portion of the precursor fibers does not react during the heating to form the first ceramic phase material. In some embodiments, at least some of the excess portion is disposed in an interior region of at least some of the reticular formations.

In some embodiments of this aspect, no precursor fibers are present in the ceramic body.

In some embodiments of this aspect, all of the first precursor present in the mixture is in the form of the precursor fibers.

In some embodiments of this aspect, the first ceramic constitutes a primary solid phase in the ceramic body. In some embodiments, the first ceramic constitutes a primary solid phase in the reticular formations.

In some embodiments of this aspect, the precursor fibers have an average length of from 1 to 10 mm. In some embodiments, the precursor fibers have an average diameter of from 1 to 100 micrometers. In some embodiments, the precursor fibers have an average length to diameter ratio of from 100:1 to 10,000:1.

In some embodiments of this aspect, the shaping comprises extruding the plasticized mixture into a green body. In some embodiments, the extruding comprises extruding the mixture through a first die to form a first extrudate, and then extruding the first extrudate through a second die to form a honeycomb shape.

In some embodiments of this aspect, the plurality of inorganic ceramic-forming precursors further comprises at least one source of silica, alumina, magnesium oxide, strontium oxide, barium oxide, calcium oxide, titania, or iron oxide. In some embodiments, the plurality of inorganic ceramic-forming precursors further comprises a source of alumina and a source of silica. In some embodiments, the plurality of inorganic ceramic-forming precursors further comprises a source of magnesia. In some embodiments, the mixture further comprises at least one organic processing component. In some embodiments, the mixture further comprises at least one processing component selected from the group consisting of binders, lubricants, plasticizers, pore formers and solvents. In some embodiments, the mixture comprises from 3 wt % to 12 wt % silica, based on total weight of the mixture. In some embodiments, the mixture comprises from 25 wt % to 54 wt % $SiO_2$, based on total weight of the mixture. In some embodiments, the mixture comprises from 10 wt % to 70 wt % alumina, based on total weight of the mixture. In some embodiments, the mixture comprises from 18 wt % to 65 wt % $Al_2O_3$, based on total weight of the mixture. In some embodiments, the mixture comprises from 25 wt % to 50 wt % titania, based on total weight of the mixture. In some embodiments, the mixture comprises from 10 wt % to 65 wt % alumina fibers, based on total weight of the mixture. In some embodiments, the mixture comprises from 5 wt % to 23 wt % MgO, based on total weight of the mixture.

In some embodiments of this aspect, the precursor fibers constitute from 18 wt % to 48 wt % alumina, based on total weight of the mixture. In some embodiments, the precursor fibers constitute at least 75 wt % alumina, based on total weight of the mixture. In some embodiments, at least part of the first ceramic is comprised of an anisotropic microstructure comprised of polycrystalline reticular formations, and wherein at least some of the precursor fibers serve as templates for the reticular formations.

In another aspect of the present disclosure, a porous ceramic body is provided having a total porosity of greater than or equal to 50%, an coefficient of thermal expansion (CTE) of less than $2 \times 10^{-7} K^{-1}$ from 20° C. to 900° C., a strain tolerance of greater than or equal to 0.10%, and an MOR>350 psi for a 300/14 honeycomb or corresponding geometry. In some embodiments, the axial CTE is less than $0.5 \times 10^{-7} K^{-1}$. In some embodiments, the axial CTE is negative. In some embodiments, the total porosity is greater than 60%. In some embodiments, the body has a d50 between 12 and 20 micrometers. In some embodiments, the body has a d50 between 15 and 20 micrometers.

In another aspect of the present disclosure, a porous ceramic body is provided having a total porosity of greater than or equal to 55%, a d50>12 micrometers, coefficient of thermal expansion (CTE) of less than $2 \times 10^{-7} K^{-1}$ from 20° C. to 900° C., a strain tolerance of greater than or equal to 0.10%, and an MOR>350 psi.

In another aspect of the present disclosure, a porous ceramic body is provided having a total porosity of greater than or equal to 55%, an MOR>350 psi, and a d50 between 15 and 20 micrometers.

The invention claimed is:

1. A porous aluminum titanate-based ceramic body comprised of a polycrystalline ceramic comprising an anisotropic microstructure, the anisotropic microstructure being comprised of aligned multiphase polycrystalline reticular formations, wherein the microstructure has an anisotropy factor 5>Af-pore-long >1.2.

2. The porous body of claim 1 wherein the reticular formations are comprised of a primary solid phase of aluminum titanate and at least one minor solid phase.

3. The porous body of claim 2 wherein the primary solid phase comprises primary phase crystals, and a majority of the crystals of the primary phase crystals have a maximum dimension of between 1 and 50 micrometers.

4. The porous body of claim 2 wherein the minor solid phase is selected from the group consisting of feldspar, mullite, cordierite, spinel, strontium titanate, and combinations thereof.

5. The porous body of claim 1 wherein the microstructure contains microcracks.

6. The porous body of claim 1 wherein the reticular formations are polycrystalline.

7. The porous body of claim 6 wherein the reticular formations comprise crystals having a maximum dimension of between 0.5 and 100 micrometers.

8. The porous body of claim 1 wherein the reticular formations constitutes greater than 5% by weight of the body.

9. The porous body of claim 1 wherein body is comprised of a primary solid phase of aluminum titanate.

10. The porous body of claim 1 wherein an exterior region of at least some of the reticular formations are comprised of a primary solid phase and an interior region of the reticular formations are comprised of a minor solid phase.

11. A porous aluminum titanate-based ceramic body comprised of a polycrystalline ceramic comprising an anisotropic microstructure, the anisotropic microstructure being comprised of aligned multiphase polycrystalline reticular formations, wherein the reticular formations are polycrystalline, and wherein the reticular formations comprise crystals having a maximum dimension of between 0.5 and 100 micrometers.

12. A porous aluminum titanate-based ceramic body comprised of a polycrystalline ceramic comprising an anisotropic microstructure, the anisotropic microstructure being comprised of aligned multiphase polycrystalline reticular formations, wherein the reticular formations are comprised of a primary solid phase of aluminum titanate and at least one minor solid phase, and wherein the primary solid phase comprises primary phase crystals, and a majority of the crystals of the primary phase crystals have a maximum dimension of between 1 and 50 micrometers.

13. A porous aluminum titanate-based ceramic body comprised of a polycrystalline ceramic comprising an anisotropic microstructure, the anisotropic microstructure being comprised of aligned multiphase polycrystalline reticular formations, wherein an exterior region of at least some of the reticular formations are comprised of a primary solid phase and an interior region of the reticular formations are comprised of a minor solid phase.

14. A porous aluminum titanate-based ceramic body comprised of a polycrystalline ceramic comprising an anisotropic microstructure, the anisotropic microstructure being comprised of aligned multiphase polycrystalline reticular formations, wherein the microstructure has an anisotropy factor 5>Af-pore-long >1.2, wherein the reticular formations are polycrystalline, and wherein the reticular formations comprise crystals having a maximum dimension of between 0.5 and 100 micrometers.

15. A porous aluminum titanate-based ceramic body comprised of a polycrystalline ceramic comprising an anisotropic microstructure, the anisotropic microstructure being comprised of aligned multiphase polycrystalline reticular formations, wherein the reticular formations are comprised of a primary solid phase of aluminum titanate and at least one minor solid phase, wherein the reticular formations are polycrystalline, wherein the reticular formations comprise crystals having a maximum dimension of between 0.5 and 100 micrometers, and wherein the primary solid phase comprises primary phase crystals, and a majority of the crystals of the primary phase crystals have a maximum dimension of between 1 and 50 micrometers.

16. A porous aluminum titanate-based ceramic body comprised of a polycrystalline ceramic comprising an anisotropic microstructure, the anisotropic microstructure being comprised of aligned multiphase polycrystalline reticular formations, wherein the microstructure has an anisotropy factor 5>Af-pore-long >1.2, wherein the reticular formations are comprised of a primary solid phase of aluminum titanate and at least one minor solid phase, and wherein the primary solid phase comprises primary phase crystals, and a majority of the crystals of the primary phase crystals have a maximum dimension of between 1 and 50 micrometers.

* * * * *